(12) United States Patent  
Matthews et al.

(10) Patent No.: US 11,824,764 B1  
(45) Date of Patent: *Nov. 21, 2023

(54) AUTO LOAD BALANCING

(71) Applicant: Innovium, Inc., San Jose, CA (US)

(72) Inventors: William Brad Matthews, San Jose, CA (US); Puneet Agarwal, Cupertino, CA (US); Rupa Budhia, San Jose, CA (US)

(73) Assignee: Innovium, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/939,751

(22) Filed: Sep. 7, 2022

Related U.S. Application Data

(63) Continuation of application No. 17/192,819, filed on Mar. 4, 2021, now Pat. No. 11,483,232, which is a continuation of application No. 16/524,575, filed on Jul. 29, 2019, now Pat. No. 11,128,561.

(51) Int. Cl.
| | |
|---|---|
| *H04L 43/0882* | (2022.01) |
| *H04L 45/00* | (2022.01) |
| *H04L 47/125* | (2022.01) |
| *H04L 47/625* | (2022.01) |
| *H04L 45/24* | (2022.01) |

(52) U.S. Cl.  
CPC ........ *H04L 45/245* (2013.01); *H04L 43/0882* (2013.01); *H04L 45/38* (2013.01); *H04L 47/125* (2013.01); *H04L 47/6255* (2013.01)

(58) Field of Classification Search  
CPC ... H04L 45/245; H04L 43/0882; H04L 45/38; H04L 47/125; H04L 47/6255  
See application file for complete search history.

(56) References Cited

U.S. PATENT DOCUMENTS

| | | | |
|---|---|---|---|
| 9,991,990 B1 * | 6/2018 | Cherubini | H03M 13/4169 |
| 10,425,340 B2 * | 9/2019 | Avidar | G01C 15/004 |
| 11,128,561 B1 | 9/2021 | Matthews et al. | |
| 11,483,232 B1 * | 10/2022 | Matthews | H04L 45/302 |
| 2005/0003363 A1 * | 1/2005 | Hobert | A01K 67/0336 |
| | | | 435/325 |

(Continued)

OTHER PUBLICATIONS

United States Patent and Trademark Office, U.S. Appl. No. 16/524,575, Non-Final Office Action dated Sep. 2, 2020.

(Continued)

*Primary Examiner* — Harry H Kim  
(74) *Attorney, Agent, or Firm* — Shield Intellectual Property PC; Zhichong Gu

(57) ABSTRACT

Automatic load-balancing techniques in a network device are used to select, from a multipath group, a path to assign to a flow based on observed state attributes such as path state(s), device state(s), port state(s), or queue state(s) of the paths. A mapping of the path previously assigned to a flow or group of flows (e.g., on account of having then been optimal in view of the observed state attributes) is maintained, for example, in a table. So long as the flow(s) are active and the path is still valid, the mapped path is selected for subsequent data units belonging to the flow(s), which may, among other effects, avoid or reduce packet re-ordering. However, if the flow(s) go idle, or if the mapped path fails, a new optimal path may be assigned to the flow(s) from the multipath group.

20 Claims, 9 Drawing Sheets

400B

(56) References Cited

U.S. PATENT DOCUMENTS

| | | | |
|---|---|---|---|
| 2006/0221974 A1* | 10/2006 | Hilla | H04L 47/2441 |
| | | | 370/412 |
| 2010/0157821 A1 | 6/2010 | Morris | |
| 2015/0163146 A1* | 6/2015 | Zhang | H04L 45/125 |
| | | | 370/238 |
| 2017/0331722 A1* | 11/2017 | Greenbaum | H04L 45/125 |
| 2018/0062994 A1 | 3/2018 | Webb | |
| 2018/0082994 A1 | 3/2018 | Han et al. | |
| 2018/0206174 A1 | 7/2018 | Zhou et al. | |
| 2018/0331697 A1* | 11/2018 | Lin | H04L 1/0057 |

OTHER PUBLICATIONS

United States Patent and Trademark Office, U.S. Appl. No. 16/524,575, Notice of Allowance dated Jan. 11, 2021.
United States Patent and Trademark Office, U.S. Appl. No. 17/192,819, Final Office Action dated Apr. 26, 2022.
United States Patent and Trademark Office, U.S. Appl. No. 17/192,819, Non-Final Office Action dated Jan. 28, 2022.
United States Patent and Trademark Office, U.S. Appl. No. 17/192,819, Notice of Allowance dated Jun. 28, 2022.

* cited by examiner

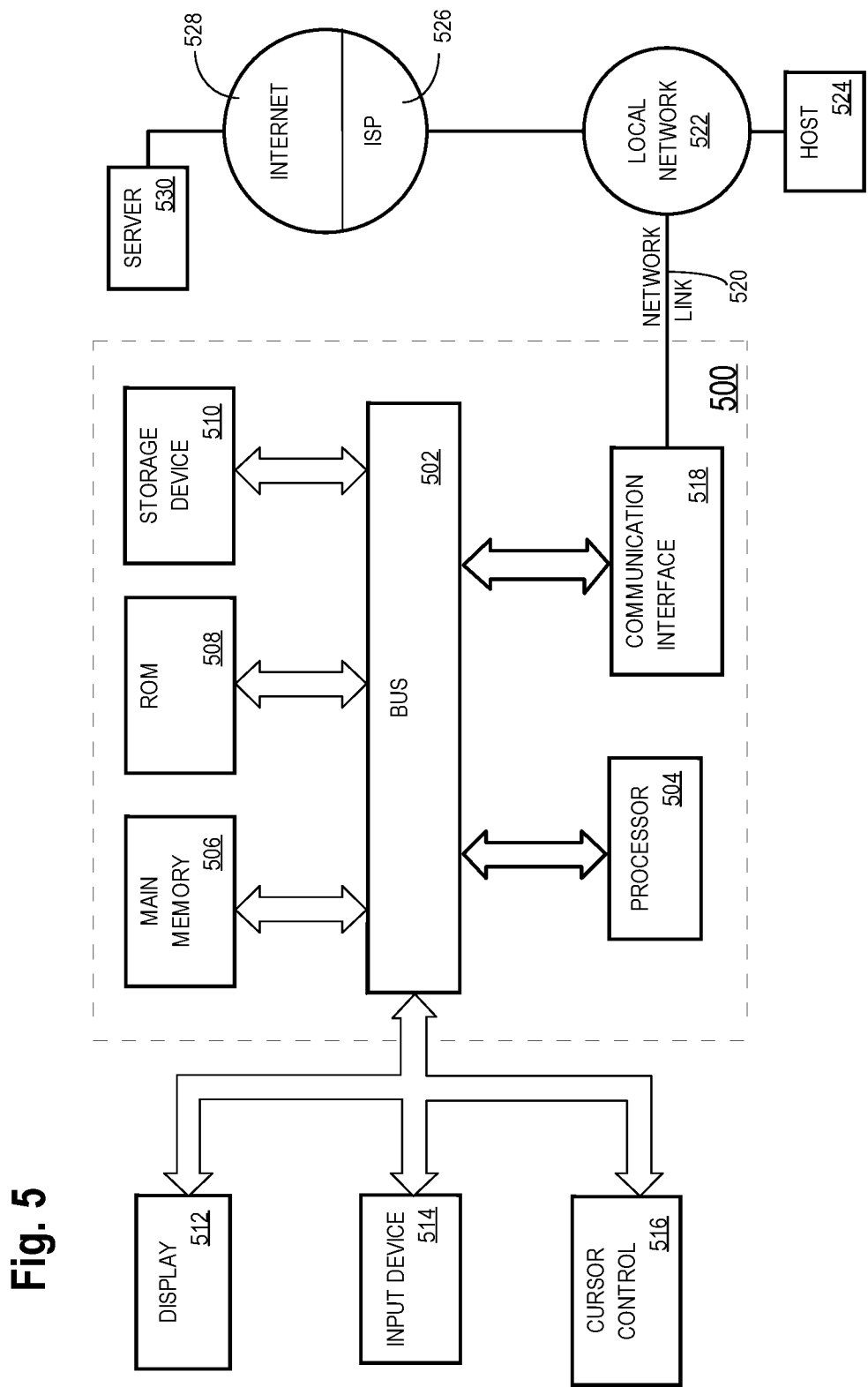

AUTO LOAD BALANCING

CROSS-REFERENCE TO RELATED APPLICATIONS

This application is a continuation of U.S. patent application Ser. No. 17/192,819 filed on Mar. 4, 2021, which is a continuation of U.S. patent application Ser. No. 16/524,575 filed on Jul. 29, 2019, now issued as U.S. Pat. No. 11,128,561, the contents of all of which are incorporated herein by reference in their entireties. The applicant(s) hereby rescind any disclaimer of claim scope in the parent application(s) or the prosecution history thereof and advise the USPTO that the claims in this application may be broader than any claim in the parent application(s).

TECHNICAL FIELD

Embodiments relate generally to handling network packets and/or other data units in systems such as, without limitation, data switching networks, and, more specifically, to techniques for automatic load balancing (ALB) of such systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A computer network is a set of computing components interconnected by communication links. Each computing component may be a separate computing device, such as, without limitation, a hub, switch, bridge, router, server, gateway, or personal computer, or a component thereof. Each computing component, or "network device," is considered to be a node within the network. A communication link is a mechanism of connecting at least two nodes such that each node may transmit data to and receive data from the other node. Such data may be transmitted in the form of signals over transmission media such as, without limitation, electrical cables, optical cables, or wireless media.

The structure and transmission of data between nodes is governed by a number of different protocols. There may be multiple layers of protocols, typically beginning with a lowest layer, such as a "physical" layer that governs the transmission and reception of raw bit streams as signals over a transmission medium. Each layer defines a data unit (the protocol data unit, or "PDU"), with multiple data units at one layer typically combining to form a single data unit in another. Additional examples of layers may include, for instance, a data link layer in which bits defined by a physical layer are combined to form a frame or cell, a network layer in which frames or cells defined by the data link layer are combined to form a packet, and a transport layer in which packets defined by the network layer are combined to form a TCP segment or UDP datagram. The Open Systems Interconnection model of communications describes these and other layers of communications. However, other models defining other ways of layering information may also be used. The Internet protocol suite, or "TCP/IP stack," is one example of a common group of protocols that may be used together over multiple layers to communicate information. However, techniques described herein may have application to other protocols outside of the TCP/IP stack.

A given node in a network may not necessarily have a link to each other node in the network, particularly in more complex networks. For example, in wired networks, each node may only have a limited number of physical ports into which cables may be plugged in to create links. Certain "terminal" nodes—often servers or end-user devices—may only have one or a handful of ports. Other nodes, such as switches, hubs, or routers, may have a great deal more ports, and typically are used to relay information between the terminal nodes. The arrangement of nodes and links in a network is said to be the topology of the network, and is typically visualized as a network graph or tree.

A given node in the network may communicate with another node in the network by sending data units along one or more different paths through the network that lead to the other node, each path including any number of intermediate nodes. The transmission of data across a computing network typically involves sending units of data, such as packets, cells, or frames, along paths through intermediary networking devices, such as switches or routers, that direct or redirect each data unit towards a corresponding destination.

In many cases, there are multiple paths by which one node in a network may communicate with another node in the network. A network device must thus include path selection logic to select between these multiple paths. Generally, the path selection logic involves identifying a group of candidate paths (also referred to herein as a "multipath group") by which a destination node is reachable from the network device, and selecting a path from the group. For example, a shortest-path-first mechanism may assign costs to each path in a group based on the topology of the network, and then select the lowest-cost path (e.g., the path the traverses the least number of nodes).

Load balancing may be implemented to distribute data units over multiple paths. A multipath group may be identified for each destination, with each destination being a single address (e.g., a single node) or set of addresses (e.g., a subnet), depending on the embodiment. In some embodiments, the multipath group may be a distinct subset of all possible paths to the destination, such as an administrator-defined group of optimal paths, or an "equal-cost" group of paths that are all topologically shortest paths or that all have the same associated cost metric.

Rather than selecting a single best path to a destination for all data units that a sender sends to the destination, the path selection logic may group the data units into different flows of traffic, and then select different paths from the multipath group for different data units, depending on which flows the data units belong to. For example, some common load balancing techniques bind arriving packet flows, as identified based on specific packet fields (e.g., OSI Layer 3 routing information, etc.), to a multipath group member that is selected from among Link Aggregation Groups (LAGs) or Equal Cost Multipathing Groups (ECMPs) based on a hash function of the specific packet fields.

BRIEF DESCRIPTION OF THE DRAWINGS

The present inventive subject matter is illustrated by way of example, and not by way of limitation, in the figures of the accompanying drawings and in which like reference numerals refer to similar elements and in which:

FIG. 5 is block diagram of a computer system upon which embodiments of the inventive subject matter may be implemented.

DETAILED DESCRIPTION

Figure 1:
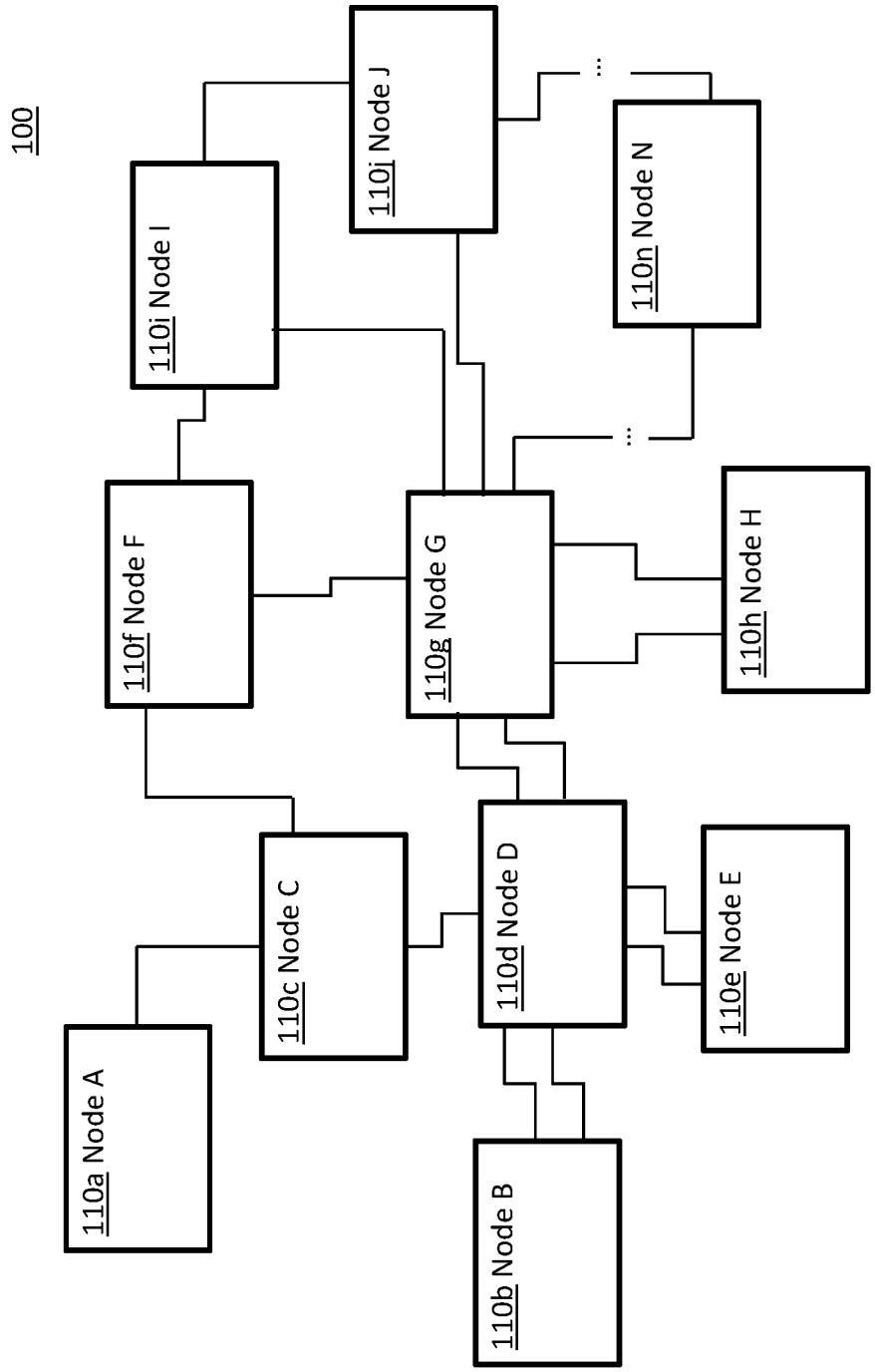
FIG. 1 is an illustrative view of an example networking system in which the techniques described herein may be practiced.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:
1.0. General Overview
2.0. Structural Overview
  2.1. Packets and Other Data Units
  2.2. Network Paths
  2.3. Network Device
  2.4. Ports
  2.5. Packet Processors
  2.6. Buffers
  2.7. Queues
  2.8. Traffic Manager
  2.9. Ingress Arbiter
  2.10. Forwarding Logic
  2.11. Multiple Pipelines
  2.12. Automatic Load Balancing
  2.13. Device Control Logic
  2.14. Miscellaneous
3.0. Functional Overview
4.0. Implementation Mechanism-Hardware Overview
5.0. Extensions and Alternatives 1.0. General Overview Many commonly used loading balancing approaches in network devices often lead to port overloading and/or excessive queue delays. For example, hash values or other mapping mechanisms used for assigning flows to multipath group members, such as ECMP members or LAG members, are typically generated based on mathematical transformations that are invariant of, and thus do not take into consideration, state information, such as device or path states.

In contrast, techniques as described herein may be used to perform automatic load balancing (ALB) on paths in multipath routing operations of a network device, such as a router, a switch, a line card in a chassis, and so forth. The techniques may be used to select, from a multipath group, the path to assign to a flow based on observed state attributes that can include, but are not limited to, path state(s), device state(s), port state(s), or queue state(s) associated with the paths. Other states beyond path and port state, such as buffer state(s) for a set of ports, flow control state(s), etc., may also be used as a basis for assigning flows to paths. A mapping of the path previously assigned to a flow or group of flows (e.g., on account of having then been optimal in view of the observed state attributes) is maintained, for example, in a table. So long as the flow(s) are active and the path is still valid, the mapped path is selected for subsequent data units belonging to the flow(s), which may, among other effects, avoid or reduce packet re-ordering. However, if the flow(s) go dormant or idle, or if the mapped path fails, a new optimal path may be assigned to the flow(s) from the multipath group.

In an embodiment, under ALB techniques as described herein, re-ordering of data units as a consequence of reassigning a flow to a different path may be reduced or even avoided, depending on configuration. At the same time, the ALB techniques may support fast, balanced, optimal failovers when flows with previously assigned paths experience problems or failures. In an embodiment, some ALB implementations may optionally configure a load balancing mechanism to aggressively move flows to optimal links to achieve higher performance at the expense of having to manage additional reordering of data units.

Data units may be grouped into traffic flows based on a variety of flow identification mechanisms. For instance, traffic flows are often identified based on data unit attributes, such as by a 5-tuple combination of the destination IP address, source IP address, destination TCP/IP port, source TCP/IP port, and protocol, or any other suitable set of one or more data unit attributes. In an embodiment, such individual traffic flows may be aggregated into ALB flows, each of which may be identified with a unique ALB flow identifier. The ALB flow identifier may be provided in a data unit itself (e.g., in a packet header), or generated from data unit attributes using a mapping function, such as a hash function, to create the unique identifier.

Thus, an ALB flow as described herein may comprise a set of one or more component traffic flows. Different component flows in the set of component flows of the ALB flows may correspond to, or are identified by, different sets of common attributes of data units in traffic flows. Each component flow in the set of component flows of the ALB flows corresponds to, or is identified by, a respective set of common attributes (e.g., a set of common 5-tuple attributes, etc.) of data units in a traffic flow or a single unique identifier in scenarios in which the unique identifier is generated (e.g., hash-based generation, etc.).

At any given time, an ALB flow may be bound or assigned to a path along which data units belonging to the flow may be sent. Depending on the embodiment and path, selection of a path may correspond to, for example, selection of a specific egress port to send the data unit from, selection of a next hop address for the data unit, or selection of an internal port or component to send the data unit to for further processing. In some embodiments, selection of a path may constitute selection of a specific sequence of network nodes along which the data unit may be sent, such as may be indicated via a label or other suitable information.

As used herein, an egress port of a network device may refer to a physical port, a logical port, etc., of the network device. A logical port may be a subdivision of a physical port or an aggregate (e.g., for trunking efficiency or backhaul connections to core networks, etc.) of multiple physical ports of the network device. Example network devices may include, but are not necessarily limited to only, any of: a standalone network device, a device with its own physical housing or chassis, a part of a device with an overall physical housing or chassis, a line card in a chassis, and so forth. Some or all physical (e.g., optical, electrical, etc.) ports of different network devices (e.g., line cards in a chassis, devices in separate physical housings, etc.) may be interconnected in operation.

In an embodiment, ALB operations as described herein may be implemented to perform load balancing on aggregations of traffic flows, known as ALB flows. Since ALB identifiers for the aggregated ALB flows are represented in a relatively small number space, the load balancing may be achieved with relatively low cost and relatively high efficiency as compared with other approaches of performing load balancing on individual traffic flows with numerous different flow identifiers represented in a relatively large number space. Additionally, optionally or alternatively, the ALB operations are dynamically adaptable to device, path, or other states, as opposed to hash-based load balancing which is agnostic to state information. In yet other embodiments, an ALB flow may correspond to a single individual traffic flow.

In some embodiments, ALB techniques as described herein may operate to load balance traffic flows dynamically and adaptively by a network device based on device, path, or other states determined by the network device with low latency, for example without needing the network device to send probes to, and receive probe responses from, other network devices, in real-time operations.

In some embodiments, a per-ALB-flow state may be tracked for each ALB flow. The per-ALB-flow state may comprise an egress port identifier or other path identifier for the assigned path from which an arriving data unit of the ALB flow is to depart and a time value indicating a time point after which the ALB flow is deemed to be inactive and therefore allowed to be reassigned from the assigned path to a new path. In some ALB operational modes, the time value may be ignored. In other words, under these ALB operational modes, an optimal path selection may be performed independent of the time value. For instance, a new path may only be provided for failover purposes, in case a current path assignment becomes invalid.

A new ALB flow that has not been assigned to a path may be assigned to an optimal path candidate selected from a plurality of group members. As an example, an optimal egress port may be selected from the set of egress ports belonging to a LAG, ECMP group, or other multipath group.

Thereafter, the ALB flow remains on the assigned path for as long as data units in the ALB flow are arriving sufficiently close in time, so as to avoid data unit re-ordering issues that could occur if the ALB flow were reassigned to a different path while the flow is active. On the other hand, the ALB flow may be evaluated and reassigned from the assigned path to an optimal path selected from among a plurality of group members of the multipath group if the ALB flow is dormant or idle for a sufficient amount of time, such as indicated by a comparison of a current time value to a timeout value for the ALB flow. This is because, since the ALB flow has been inactive, it is unlikely data unit re-ordering would occur, even if the ALB flow were reassigned to a new optimal path.

In addition to adaptively load balancing flows or data units therein toward optimal paths, as indicated by device, path, and/or other states that are dynamically determined or tracked, ALB techniques as described herein may also be used to support failover operations in a fast, efficient, relatively accurate and failsafe manner. For example, when a network administrator pulls a connection from a physical port, a network device implementing the ALB techniques may automatically identify optimal replacement port candidates for ALB flows that are assigned to the disabled physical port. The ALB flows affected by this port failure may be automatically reassigned to the optimal path candidates that have not been affected by the path failure in a relatively short time (e.g., in one clock cycle, in a fixed number of clock cycles, within a strict time budget, etc.). In an embodiment, assigning the replacement port with ALB techniques as described herein performs faster than assigning a replacement port with software-based failover solutions implemented on a CPU, and, in addition, permits the failover recovery task to be offloaded from the CPU, thereby freeing the CPU to support other tasks.

Device states, path states, and/or other states that may be used to determine optimal path selections by ALB operations may include delay-based measures, such as queue delay, port delay, path delay, and so forth. Path measures of an egress port loading or utilization, logical port loading, or path loading with respect to the target for the path may also be used. Secondary states may be included in the selection decision process, including the port status (e.g., up or down) and flow control status (e.g., queue or port flow controlled). Resource usage, such as queue length (in cells, bytes, packets, etc.), port length (in cells, bytes, packets, etc.), total buffer or partition usage (in cells, bytes, packets, etc.), and so forth, can also be added to the selection process to avoid packet loss. Additional measures to consider may include port conditions or states that can be measured by delay-based measures, port loading measures, or other measures observed directly by components of a network device. As used herein, a port loading measure may represent a ratio of an amount of data transmitted to a maximum amount of data that could be transmitted over some unit of time, as observed by an egress packet processor or other suitable component, whereas a delay measure may represent a delay across a given egress queue as observed by a traffic manager, or other queue.

In an embodiment, some or all components within the network device may include separate instances of ALB logic for collecting path state information and/or implementing ALB flow decisions. Device states, path states, and/or other states maintained outside of the ALB instances may be aggregated by one or more aggregation units and broadcast to all ALB instances in the network device. For instance, the state information may be partly derived from port loading statuses, such as instantaneous, average and/or maximum port loading measures, or delay measures as maintained by egress ports or a processing block (e.g., egress packet processors, etc.) along data unit transmission paths.

Paths may be measured with different sets of state measures. For example, a composite path state may be constructed based on a combination of the egress port loading and egress queue delay state with some or all ALB flows, combining the egress port loading state associated with the set of egress ports used in an ALB multipath group and the queue delay associated with the flow type for the ALB flow for each of the corresponding egress ports.

In an embodiment, the flow types supported may be grouped into lossy and lossless categories, using data unit attributes such as priority, traffic class, and so forth to map the flows into their respective categories. Additionally, optionally or alternatively, delay measures may be aggregated such that one or more queues may be mapped into the same delay class, such as lossless-1 delay class, lossless-2 delay class, latency sensitive lossy delay class, and so forth. In such a scenario, a policy may be implemented to resolve how the aggregated delay should be reported. Example policies include, without limitation, taking the average of delays across the set of queues being aggregated and taking the maximum of the delays across the set of queues to be aggregated.

Combining multiple measures into one composite path state value may use a mapping function that utilizes a weighted sum of each measure to generate single numerical value. Additional policy attributes may be used to apply a pre-processing function to each measure, such as applying maximum or minimum functions to each value, mapping each value into a smaller (or larger) number space using a linear (e.g., quantization) or non-linear mapping, etc. Post-processing functions may be applied to the weighted sum as well. In addition, contributions and/or weights for different measures for a path may be set by a user, such as a network administrator, programmatically by a network operation and administration system, by artificial intelligence or machine learning logics, etc.

The timeout value for an ALB flow is computed based on the last time a data unit was received for the flow plus some threshold amount of time after which an idle flow—a flow for which no further data units has been received—is considered to timeout, or have become inactive. The timeout threshold may be set based on one or more factors automatically, with no or little user input, or alternatively at least partially manually with user input. In a non-limiting example, the threshold may be set at least in part through a user configurable attribute. In another non-limiting example, the threshold may also or instead be set based on measured path delays. For example, timeout thresholds may be selected based on the worst-case network path skew across all network paths for a given ALB group. The path skew is a measure of the difference in observed path delay values experienced for a given path. Suppose, for example, the worst-case network path skew is one microsecond across all paths. Then, the timeout threshold used for a given ALB flow to minimize reordering across all paths in an ALB multipath group can be configured to be less than one microsecond.

Alternatively, an implementation could first resolve an optimal path and then compute an estimated skew between the current path assignment and the optimal path selection. If the ALB flow has been idle or dormant for a time period that exceeds the estimated skew (and optionally plus a certain pre-configured amount of time added as a safety margin), then the ALB flow may be considered to have already timed out. In this scenario, the timeout field is reset to 0 on every packet arrival to the ALB flow, and is incremented by a background process periodically to track how long it has been idle or dormant.

In an embodiment, the network device may send out probe packets to destinations along certain paths to collected path state information, such as path delay values and congestion. Such information may be utilized to compute path skew values in real-time, and compute appropriate timeout thresholds based thereon.

Additionally, optionally or alternatively, relatively long-term traffic related information may be collected and analyzed by human experts, AI or ML based algorithms, or other means. The results of such analyses can then be used to set timeout thresholds to influence real-time ALB based path selection operations as described herein. Timeout thresholds may be adaptively set at runtime, with relatively high stability or relatively high dynamics depending on specific operational scenarios.

An ALB flow may be idle or dormant for an indeterminate time. As time values may be represented with finite values (e.g., one millisecond to one second, etc.), rollover in these values may eventually occur. For example, these values may increment along the time direction but may eventually be reset back to zero or a restarted value close to zero. Additional mechanisms may be implemented under ALB techniques to properly handle the rollover of time values and to ensure that state information determined at least in part based on these time values are relatively accurate and timely in terms of ALB operations in real-time.

Values for measures as described herein may be mapped linearly or nonlinearly to an overall numeric value (e.g., in a normalized value range of 1 to 10, etc.) indicating an overall state as previously discussed. Additionally, optionally or alternatively, one or more mapping functions may be applied for the purpose of manipulating or mapping some or all the measures into mapped or normalized values.

In some operational scenarios, the values of the measures may be mapped with a linear or non-linear function or mapping to the overall path condition constrained in a bounded range. For instance, such mappings may be implemented through a nonlinear function such as a sigmoid function, a fixed function specified with a lookup table, or any other suitable mechanism. In various embodiments, different traffic flow types (e.g., lossy, lossless, delay sensitive, delay insensitive, bursty, large or small peak bandwidth, etc.), different ALB flows, different paths, different ALB multipath groups, and so forth, may use the same or different mappings, curves, lookup tables, etc., to map their respective measure values into overall port conditions or states. In an embodiment, each ALB multipath group may be configured differently. In some operational scenarios, little configuration if any is based on ALB flows, other than selecting which view or subset of path condition values to create.

The overall path condition may be used by ALB operations to make optimal path selections. In some operational scenarios, a path selection sequence may be constructed based at least in part on the computed path conditions in an ALB multipath group. The optimal path selections may be identified from all eligible paths as determined with the path selection sequence in a round-robin manner that traverses through the eligible paths (e.g., egress ports, next-hops, system ports, etc.) in the path selection sequence. Overall path conditions of these eligible paths in sequence entries of the path selection sequence may be used to rank paths, such as being of high quality, medium quality, or low quality, and to decide or determine which specific eligible path among the eligible paths is to be selected at any given time. Numerical rankings, referred to as path state values, may be assigned to paths, indicating the condition of the path, such as a 10 for a path in good condition, or a 1 for a path in poor condition). Additionally, optionally or alternatively, overloading of specific paths may be avoided by the ALB based path selection operations. In some implementations, the optimal path selections may be identified from all eligible paths by performing a random or pseudo-random selection from the set of eligible paths, where the selection can provide a uniform distribution or configurable non-uniform distribution.

A path selection sequence may be generated or updated from time to time. To enable relatively fast failsafe failover operations, the path selection sequence may be updated on a relatively frequent basis, limiting or preventing transient failures due to stale port conditions or states in the path selection sequence. Alternatively, the path selection sequence may be filtered based on device, path, or other state, such as if a path is available or not. For example, if paths in the path selection sequence correspond to egress ports, then any path that corresponds to an egress port that is down is removed or marked unavailable prior to performing a path selection. In this scenario, the path selection only selects from paths that appear in the path selection sequence and are available (e.g., not filtered out, etc.).

In an embodiment, ALB techniques may be used as an alternative path selection mechanism for a certain subset of traffic flows in the network device. Instead of using a default path selection logic, such as ECMP, LAG, or other group-based path selection mechanisms, certain groups may be marked as ALB-eligible. A path may be selected for these groups using the ALB path selection logic instead. In yet other embodiments, ALB path selection may be used exclusively.

In other aspects, the inventive subject matter encompasses computer apparatuses and computer-readable media configured to carry out the foregoing techniques.

2.0. Structural Overview

FIG. 1 is an illustrative view of an example networking system 100, also referred to as a network, in which the techniques described herein may be practiced, according to an embodiment. Networking system 100 comprises a plurality of interconnected nodes 110a-110n (collectively nodes 110), each implemented by a different computing device. For example, a node 110 may be a single networking computing device, such as a router or switch, in which some or all of the processing components described herein are implemented in application-specific integrated circuits (ASICs), field programmable gate arrays (FPGAs), a line card in a chassis, or other integrated circuit(s). As another example, a node 110 may include one or more memories storing instructions for implementing various components described herein, one or more hardware processors configured to execute the instructions stored in the one or more memories, and various data repositories in the one or more memories for storing data structures utilized and manipulated by the various components.

Each node 110 is connected to one or more other nodes 110 in network 100 by one or more communication links, depicted as lines between nodes 110. The communication links may be any suitable wired cabling or wireless links. Note that system 100 illustrates only one of many possible arrangements of nodes within a network. Other networks may include fewer or additional nodes 110 having any number of links between them.

2.1. Packets and Other Data Units

While each node 110 may or may not have a variety of other functions, in an embodiment, each node 110 is configured to send, receive, and/or relay data to one or more other nodes 110 via these links. In general, data is communicated as series of discrete units or structures of data represented by signals transmitted over the communication links.

Different nodes 110 within a network 100 may send, receive, and/or relay data units at different communication levels, or layers. For instance, a first node 110 may send a data unit at the network layer (e.g., a TCP segment, IP packet, etc.) to a second node 110 over a path that includes an intermediate node 110. This data unit will be broken into smaller data units at various sublevels before it is transmitted from the first node 110. These smaller data units may be referred to as "subunits" or "portions" of the larger data unit.

For example, the data unit may be sent in one or more of: packets, cells, collections of signal-encoded bits, etc., to the intermediate node 110. Depending on the network type and/or the device type of the intermediate node 110, the intermediate node 110 may rebuild the entire original data unit before routing the information to the second node 110, or the intermediate node 110 may simply rebuild certain subunits of the data (e.g., frames and/or cells) and route those subunits to the second node 110 without ever composing the entire original data unit.

When a node 110 receives a data unit, it typically examines addressing information within the data unit (and/or other information within the data unit) to determine how to process the data unit. The addressing information may be, for instance, an Internet Protocol (IP) address, MPLS label, or any other suitable information. If the addressing information indicates that the receiving node 110 is not the destination for the data unit, the receiving node 110 may look up the destination node 110 within receiving node's routing information and route the data unit to another node 110 connected to the receiving node 110 based on forwarding instructions associated with the destination node 110 (or an address group to which the destination node belongs). The forwarding instructions may indicate, for instance, an outgoing port over which to send the data unit, a label to attach the data unit, a next hop, etc. In cases where multiple (e.g., equal-cost, non-equal-cost, etc.) paths to the destination node 110 are possible, the forwarding instructions may include information indicating a suitable approach for selecting one of those paths, or a path deemed to be the best path may already be defined.

Addressing information, flags, labels, and other metadata used for determining how to handle a data unit are typically embedded within a portion of the data unit known as the header. The header is typically at the beginning of the data unit, and is followed by the payload of the data unit, which is the information actually being sent in the data unit. A header is typically comprised of fields of different types, such as a destination address field, source address field, destination port field, source port field, and so forth. In some protocols, the number and the arrangement of fields may be fixed. Other protocols allow for arbitrary numbers of fields, with some or all of the fields being preceded by type information that explains to a node the meaning of the field.

A traffic flow is a sequence of data units, such as packets, with common attributes, typically being from a same source to a same destination. In an embodiment, the source of the traffic flow may mark each data unit in the sequence as a member of the flow using a label, tag, or other suitable identifier within the data unit. In another embodiment, the flow is identified by deriving an identifier from other fields in the data unit (e.g., a "five-tuple" or "5-tuple" combination of a source address, source port, destination address, destination port, and protocol). A flow is often intended to be sent in sequence, and network devices may therefore be configured to send all data units within a given flow along a same path to ensure that the flow is received in sequence.

Data units may be single-destination or multi-destination. Single-destination data units are typically unicast data units, specifying only a single destination address. Multi-destination data units are often multicast data units, specifying multiple destination addresses, or addresses shared by multiple destinations. However, a given node may in some circumstances treat unicast data units as having multiple destinations. For example, the node may be configured to mirror a data unit to another port such as a law enforcement port or debug port, copy the data unit to a central processing unit for diagnostic purposes or suspicious activity, recirculate a data unit, or take other actions that cause a unicast data unit to be sent to multiple destinations. By the same token, a given data unit may in some circumstances treat a multicast data unit as a single-destination data unit, if, for example all destinations targeted by the data unit are reachable by the same egress port.

For convenience, many of the techniques described in this disclosure are described with respect to routing data units that are IP packets in an L3 (level 3) network, or routing the constituent cells and frames thereof in an L2 (level 2) network, in which contexts the described techniques have particular advantages. It will be recognized, however, that these techniques may also be applied to realize advantages in routing other types of data units conforming to other protocols and/or at other communication layers within a network. Thus, unless otherwise stated or apparent, the techniques described herein should also be understood to apply to contexts in which the "data units" are of any other type of data structure communicated across a network, such as segments or datagrams. That is, in these contexts, other types of data structures may be used in place of packets, cells, frames, and so forth.

It will be appreciated that the actual physical representation of a data unit may change as a result of the processes described herein. For instance, a data unit may be converted from a physical representation at a particular location in one memory to a signal-based representation, and back to a physical representation at a different location in a potentially different memory, as it is moved from one component to another within a network device or even between network devices. Such movement may technically involve deleting, converting, and/or copying some or all of the data unit any number of times. For simplification, however, the data unit is logically said to remain the same data unit as it moves through the device, even if the physical representation of the data unit changes. Similarly, the contents and/or structure of a data unit may change as it is processed, such as by adding or deleting header information, adjusting cell boundaries, or even modifying payload data. A modified data unit is nonetheless still said to be the same data unit, even after altering its contents and/or structure.

2.2. Network Paths

Any node in the depicted network 100 may communicate with any other node in the network 100 by sending data units through a series of nodes 110 and links, referred to as a path. For example, Node B (110*b*) may send data units to Node H (110*h*) via a path from Node B to Node D to Node E to Node H. There may be a large number of valid paths between two nodes. For example, another path from Node B to Node H is from Node B to Node D to Node G to Node H.

In an embodiment, a node 110 does not actually need to specify a full path for a data unit that it sends. Rather, the node 110 may simply be configured to calculate the best path for the data unit out of the device (e.g., which egress port it should send the data unit out on). When a node 110 receives a data unit that is not addressed directly to the node 110, based on header information associated with a data unit, such as path and/or destination information, the node 110 relays the data unit along to either the destination node 110, or a "next hop" node 110 that the node 110 calculates is in a better position to relay the data unit to the destination node 110. In this manner, the actual path of a data unit is product of each node 110 along the path making routing decisions about how best to move the data unit along to the destination node 110 identified by the data unit.

2.3. Network Device

Figure 2:
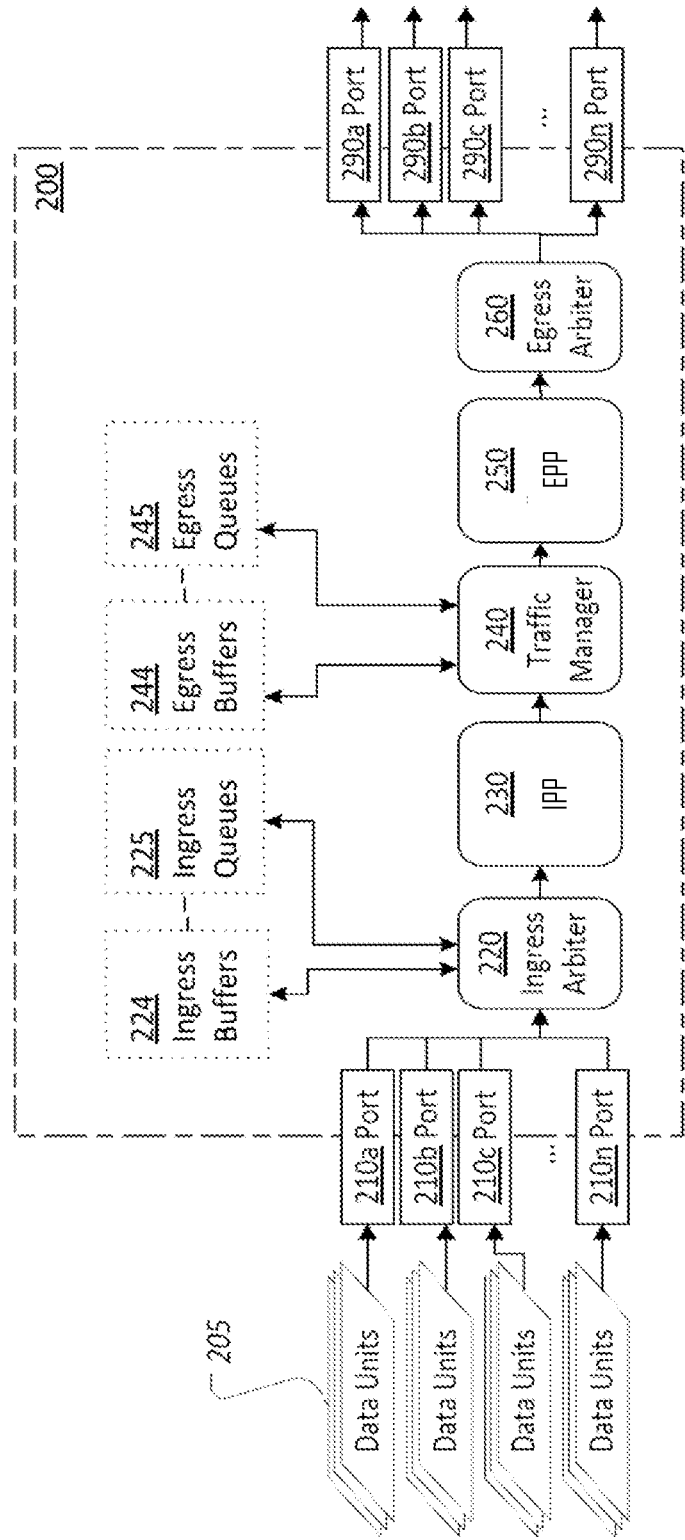
FIG. 2 is an illustrative view of an example network device in which techniques described herein may be practiced.

FIG. 2 is an illustrative view of an example network device 200 in which techniques described herein may be practiced, according to an embodiment. Network device 200 is a computing device comprising any combination of hardware and software configured to implement the various logical components described herein, including components 210-290. For example, the apparatus may be a single networking computing device, such as a router or switch, in which some or all of the components 210-290 described herein are implemented using application-specific integrated circuits (ASICs), field programmable gate arrays (FPGAs), etc. As another example, an implementing apparatus may include one or more memories storing instructions for implementing various components described herein, one or more hardware processors configured to execute the instructions stored in the one or more memories, and various data repositories in the one or more memories for storing data structures utilized and manipulated by various components 210-290.

Device 200 is generally configured to receive and forward data units 205 to other devices in a network, such as network 100, by means of a series of operations performed at various components within the device 200. Note that, in an embodiment, some or all of the nodes 110 in system 100 may each be or include a separate network device 200. In an embodiment, a node 110 may include more than one device 200. In an embodiment, device 200 may itself be one of a number of components within a node 110. For instance, network device 200 may be an integrated circuit, or "chip," dedicated to performing switching and/or routing functions within a network switch or router. The network switch or router may further comprise one or more central processor units, storage units, memories, physical interfaces, LED displays, or other components external to the chip, some or all of which may communicate with the chip.

A non-limiting example flow of a data unit 205 through components of a device 200 is as follows. The data unit 205 may be received by a port 210. The data unit 205 is buffered by an arbiter 220 until it can be processed by an ingress packet processor (IPP) 230, and then delivered to an interconnect. From the interconnect, the data unit 205 is forwarded to a traffic manager 240. Traffic manager 240 stores the data unit 205 in a buffer 244 and assigns the data unit 205 to a queue 245. Traffic manager 240 manages the flow of the data unit 205 through the queue 245 until the data unit 205 is released to an egress packet processor (EPP) 250. Depending on the processing, the traffic manager 240 may then assign the data unit 205 to another queue 245 so that it may be processed by yet another EPP 250, or the EPP 250 may send the data unit 205 to an egress arbiter 260 from which the data unit 205 is finally forwarded out another port 290.

Example components of a device 200 are now described in further detail.

2.4. Ports

Network device 200 includes ports 210/290. Ports 210, including ports 210*a-n*, are inbound ("ingress") ports by which data units 205 are received over a network, such as network 210. Ports 290, including ports 290*a-n*, are outbound ("egress") ports by which at least some of the data units 205 are sent out to other destinations or next hops within the network, after having been processed by the network device 200.

Data units 205 may be of any suitable structure, such as packets, cells, frames, etc. In an embodiment, data units 205 are packets. However, the individual atomic data units upon which the depicted components may operate may be actually be subunits of the data units 205, such as cells or frames. For example, data units 205 may be received, acted upon, and transmitted at a cell or frame level. These cells or frames are logically linked together as the data units 205 (e.g., packets) to which they respectively belong for purposes of determining how to handle the cells or frames. However, the cells or frames may not actually be assembled into data units 205 within device 200, particularly if the cells or frames are being forwarded to another destination or next hop through device 200.

Ports 210/290 are depicted as separate ports for illustrative purposes, but may actually correspond to the same physical hardware ports (e.g., network jacks or interfaces) on the network device 210. That is, a network device 200 may both receive data units 205 and send data units 205 over a single physical port, and the single physical port may thus function as both an ingress port 210 and egress port 290. Nonetheless, for various functional purposes, certain logic of the network device 200 may view a single physical port as a separate ingress port 210 and egress port 290. Moreover, for various functional purposes, certain logic of the network device 200 may subdivide a single physical ingress port or egress port into multiple ingress ports 210 or egress ports 290, or aggregate multiple physical ingress ports or egress ports into a single ingress port 210 or egress port 290. Hence, in various embodiments, ports 210 and 290 should be understood as distinct logical constructs (e.g., next hops, etc.) that are mapped to physical ports rather than simply as distinct physical constructs.

In some embodiments, the ports 210/290 of a device 200 may be coupled to one or more transceivers, such as Serializer/Deserializer ("SerDes") blocks. For instance, ports 210 may provide parallel inputs of received data units 205 into a SerDes block, which then outputs the data units 205 serially into an ingress arbiter 220 or other suitable component. On the other end, an egress packet processor may output data units 205 serially into another SerDes block, which the outputs the data units in parallel to ports 290. There may be any number of input and output SerDes blocks, of any suitable size, depending on the specific implementation (e.g., four groups of 4×25 gigabit blocks, eight groups of 4×100 gigabit blocks, etc.).

2.5. Packet Processors

A device 200 comprises one or more packet processors, such as the depicted IPP 230 and EPP 250, that collectively implement forwarding logic by which the device 200 is configured to determine how to handle each data unit 205 that the device 200 receives. These packet processors may be any suitable combination of fixed circuitry and/or software-based logic, such as specific logic components implemented by one or more Field Programmable Gate Arrays (FPGAs) or Application-Specific Integrated Circuits (ASICs), or a general-purpose processor executing software instructions.

Different packet processors may be configured to perform different packet processing tasks. These tasks may include, for example, identifying paths along which to forward data units 205, forwarding data units 205 to egress arbiters 260, implementing flow control and/or other policies, manipulating packets, performing statistical or debugging operations, making measurements related to delays and/or port loadings, determining port conditions and/or states, aggregating and broadcasting port conditions and/or states, performing hash-based loading balancing, performing ALB operations, and so forth. A device 200 may comprise any number of packet processors configured to perform any number of processing tasks.

In an embodiment, the packet processors within a device 200 may be arranged such that the output of one packet processor is, eventually, inputted into another packet processor, in such a manner as to pass data units 205 from certain packet processor(s) to other packet processor(s) in a sequence of stages, until finally disposing of the data units 205 (e.g., by sending the data units 205 out an egress port 290, "dropping" data units 205, etc.). The exact set and/or sequence of packet processors that process a given data unit 205 may vary, in some embodiments, depending on the attributes of the data unit 205 and/or the state of the device 200. There is no limit to the number of packet processor(s) that may be chained together in such a manner.

Based on decisions made while processing a data unit 205, a packet processor may, in some embodiments, and/or for certain processing tasks, manipulate a data unit 205 directly. For instance, the packet processor may add, delete, or modify information in a data unit header or payload. In other embodiments, and/or for other processing tasks, a packet processor may generate control information that accompanies the data unit 205, or is merged with the data unit 205, as the data unit 205 continues through the device 200. This control information may then be utilized by other components of the device 200 to implement decisions made by the packet processor.

In an embodiment, a packet processor need not necessarily process an entire data unit 205, but may rather only receive and process a subunit of a data unit, such as a subunit comprising header information for the data unit. For instance, if the data unit is a packet comprising multiple cells, the first cell, or a first subset of cells, might be forwarded to a packet processor, while the remaining cells of the packet (and potentially the first cell(s) as well) are forwarded in parallel to a merger component where they await results of the processing.

Ingress and Egress Processing

In an embodiment, a packet processor may be generally classified as an IPP 230 or an EPP 250. Generally, an IPP 230 (e.g., incorporating some or all ALB techniques as described herein, etc.) resolves destinations for a traffic manager 240 to determine which ports 290 and/or queues 245 a data unit 205 should depart from. There may be any number of IPPs 230, including just a single IPP 230.

In an embodiment, an IPP 230 performs certain intake tasks on data units 205 as they arrive. These intake tasks may include, for instance, and without limitation, parsing data units 205, performing routing related lookup operations, categorically blocking data units 205 with certain attributes and/or when the device 200 is in a certain state, duplicating certain types of data units 205, making initial categorizations of data units 205, receiving port conditions/states from traffic managers, performing hash-based loading balancing, performing ALB operations, and so forth. Once the appropriate intake task(s) have been performed, the data units 205 are forwarded to an appropriate traffic manager 240, to which the IPP 230 may be coupled directly or via various other components, such as an interconnect component.

The EPP(s) 250 of a device 200, by contrast, may be configured to perform non-intake tasks necessary to implement the forwarding logic of the device 200. These tasks may include, for example, tasks such as identifying paths along which to forward data units 205, implementing flow control and/or other policies, manipulating data units 205, performing statistical or debugging operations, making measurements related to delays and/or port loadings, determining port conditions and/or states, sending measurements and/or port conditions/states to traffic managers, and so forth. In an embodiment, there may be different EPP(s) 250 assigned to different flows or other categories of traffic, such that not all data units 205 will be processed by the same EPP 250.

In an embodiment, each EPP 250 is coupled to a different group of egress ports 290 to which they may send data units 205 processed by the EPP 250. In an embodiment, access to a group of ports 290 may be regulated via an egress arbiter 260 coupled to the EPP 250.

In some embodiments, an EPP 250 may also or instead be coupled to other potential destinations, such as an internal central processing unit, a storage subsystem, or a traffic manager 240. In an embodiment, multiple EPP(s) 250 may be chained together such that a data unit 205 processed by a first EPP 250 is later processed by a second EPP 250 configured to send the data unit 205 out a specific port 290. There is no limit to the number of EPP(s) 250 within such a chain.

2.6. Buffers

Since not all data units 205 received by the device 200 can be processed by the packet processor(s) within device 200 at the same time, various components of device 200 may temporarily store data units 205 in memory structures referred to as buffers while the data units 205 are waiting to be processed. For instance, device 200 may include ingress buffers 224 and egress buffers 244, used to buffer data units 205 prior to processing by an IPP 230 and EPP 250, respectively. For instance, a certain EPP 250 may only be capable of processing a certain number of data units 205, or portions of data units 205, in a given clock cycle, meaning that other data units 205, or portions of data units 205, must either be ignored (e.g., dropped) or stored in egress buffers 244. At any given time, a large number of data units 205 may be stored in the buffers of the device 200, depending on network traffic conditions.

A buffer may be a portion of any type of memory, including volatile memory and/or non-volatile memory. In an embodiment, each buffer comprises many addressable "slots" or "entries" (e.g., rows, columns, etc.) in which data units 205, or portions thereof, may be stored.

A device 200 may include a variety of buffers, each utilized for varying purposes and/or components. Generally, a data unit 205 awaiting processing by a component is held in a buffer associated with that component until the data unit 205 is "released" to the component for processing.

Some or all of the components that utilize one or more buffers may include a buffer manager configured to manage use of those buffer(s). Among other processing tasks, the buffer manager may, for example, allocate and deallocate specific segments of memory for buffers, create and delete buffer entries within that memory, identify available buffer entries in which to store a data unit 205 or portion thereof, maintain a mapping of data units 205 to buffer entries in which data for those data units 205 is stored, determine when a data unit 205 must be dropped because it cannot be stored in a buffer, perform garbage collection on buffer entries for data units 205 (or portions thereof) that are no longer needed, and so forth.

A buffer manager may include buffer assignment logic. The buffer assignment logic is configured to identify which buffer entry or entries should be utilized to store a given data unit 205, or portion thereof. In some embodiments, each data unit 205 is stored in a single entry. In yet other embodiments, a data unit is received as, or divided into, constituent data unit portions, such as fixed-size cells or frames. The buffers may store these constituent data unit portions separately (e.g., not at the same address location, or even within the same physical or logical bank). The one or more buffer entries in which a data unit 205 are stored are marked as utilized to prevent newly received data units 205 from overwriting data units 205 that are already buffered. After a data unit 205 is released from the buffer, the one or more entries in which the data unit 205 is buffered may then be marked as available for storing new data units 205.

In some embodiments, the buffer assignment logic is relatively simple, in that data units 205 or data unit portions are assigned to buffers randomly or using a round-robin approach. In some embodiments, data units 205 are assigned to buffers at least partially based on characteristics of those data units 205, such as corresponding traffic flows, destination addresses, source addresses, ingress ports, and/or other metadata. For example, different buffers may be utilized to store data units 205 received from different ports 210 or sets of ports 210. In an embodiment, the buffer assignment logic also or instead utilizes buffer state information, such as utilization metrics to be used in ALB or non-ALB operations, to determine which buffer entry to assign to a data unit. Other assignment considerations may include buffer assignment rules (e.g., no writing two consecutive cells from the same packet to the same bank) and I/O scheduling conflicts (e.g., to avoid assigning a data unit to a bank when there are no available write operations to that bank on account of other components reading content already in the bank).

2.7. Queues

In an embodiment, to manage the order in which data units 205 are processed from the buffers, various components of a device 200 may implement queueing logic. For example, the flow of data units through buffers 224 may be managed using ingress queues 225 while the flow of data units through buffers 244 may be managed using egress queues 245.

Each data unit 205, or the buffer locations(s) in which the date unit is stored, is said to belong to one or more constructs referred to as queues. Typically, a queue is a set of memory locations (e.g., in the buffers) arranged in some order by metadata describing the queue. The memory locations may (and often are) non-contiguous relative to their addressing scheme and/or physical arrangement. For example, the metadata for one queue may indicate that the queue is comprised of, in order, entry addresses 2, 50, 3, and 82 in a certain buffer.

In many embodiments, the sequence in which the queue arranges its constituent data units 205 or data unit portions corresponds to the order in which the data units 205 or data unit portions in the queue will be released and processed. Such queues are known as first-in-first-out ("FIFO") queues, though in other embodiments other types of queues may be utilized.

In some embodiments, the number of data units 205 or data unit portions assigned to a given queue at a given time may be limited, either globally or on a per-queue basis, and this limit may change over time.

2.8. Traffic Manager

According to an embodiment, a device 200 further includes one or more traffic managers 240 configured to control the flow of data units 205 to EPP(s) 250, receive port monitoring data such as measurements or port conditions/states from the EPP(s) 250, aggregate the received port monitoring data into overall port conditions/states, distribute/broadcast the overall port conditions/states to IPP(s) 230 to be used for ALB operations, and so forth. A traffic manager 240 receives data units 205 from IPPs 230 and/or other components of device 200. Traffic manager 240 may include or be coupled to egress buffers 244 for buffering data units 205 prior to sending those data units 205 to their respective EPP(s) 250. A buffer manager within the traffic manager 240 may temporarily store data units 205 in egress buffers 244 as they await processing by EPP(s) 250. The number of egress buffers 244 may vary depending on the embodiment. A data unit 205 or data unit portion in an egress buffer 244 may eventually be "released" to one or more EPP(s) 250 for processing, by reading the data unit 205 from the buffer 244 and sending the data unit 205 to the EPP(s) 250. In an embodiment, traffic manager 240 may release up to a certain number of data units 205 from buffers 244 to EPPs 250 each clock cycle or other defined time slot.

Beyond managing the use of buffers 244 to store data units 205 (or copies thereof), the traffic manager 240 may include queue management logic configured to assign buffer entries to egress queues 245 and manage the flow of data units 205 through the egress queues 245. The traffic manager 240 may, for instance, identify a specific queue 245 to assign a data unit 205 to upon receipt of the data unit 205. The traffic manager 240 may further determine when to release—also referred to as "dequeuing"—data units 205 (or portions thereof) from queues 245 and provide those data units 205 to specific EPPs 250. Buffer management logic in the traffic manager 240 may further "deallocate" entries in buffers 244 that store data units that are no longer linked to egress queues 245. These entries are then reclaimed for use in storing new data through a garbage collection process.

In an embodiment, different egress queues 245 may exist for different destinations. For example, each port 210 and/or port 290 may have its own set of queues 245. The queue 245 to which a data unit 205 is assigned and linked may, for instance, be selected based on forwarding information indicating which port 290 the data unit 205 should depart from. In an embodiment, a different EPP 250 may be associated with each different set of one or more queues 245. In an embodiment, the current processing context of the data unit 205 may be used to select which queue 245 a data unit 205 should be assigned to.

In an embodiment, there may also or instead be different egress queues 245 for different flows or sets of flows. That is, each identifiable traffic flow or group of traffic flows is assigned its own set of queues 245 to which its data units 205 are respectively assigned. In an embodiment, different queues 245 may correspond to different classes of traffic or quality-of-service (QoS) levels. Different queues 245 may also or instead exist for any other suitable distinguishing properties of the data units 205, such as source address, destination address, packet type, and so forth.

In the course of processing a data unit 205, a device 200 may replicate a data unit 205 one or more times for purposes such as, without limitation, multicasting, mirroring, debugging, and so forth. For example, a single data unit 205 may be replicated to multiple egress queues 245. For instance, a data unit 205 may be linked to separate queues 245 for each of ports 1, 3, and 5. As another example, a data unit 205 may be replicated a number of times after it reaches the head of a queue 245 (e.g., for different EPPs 250). Hence, though certain techniques described herein may refer to the original data unit 205 that was received by the device 200, it will be understood that those techniques will equally apply to copies of the data unit 205 that have been generated for various purposes. A copy of a data unit 205 may be partial or complete. Moreover, there may be an actual physical copy of the data unit 205 in buffers 244, or a single copy of the data unit 205 may be linked from a single buffer location to multiple queues 245 at the same time.

2.9. Ingress Arbiter

A device 200 may further include one or more ingress arbitration components, or arbiters, 220, deployed in front of one or more IPPs 230. Similar to an egress traffic manager 240, an ingress arbiter 220 controls the flow of data units into an IPP 230, and in fact may sometimes be known as ingress traffic manager. Each arbiter 220 comprises or is coupled to an ingress buffer 224. An ingress arbiter 220 may utilize buffers 224 to temporarily store incoming data units 205 before sending them to an IPP 230. An ingress arbiter 220 may be configured to always store incoming data units 205 in buffers 224, or only when needed to avoid potential drops at oversaturated downstream components.

An ingress arbiter 220 may store data units 205, or data unit portions, that it receives in entries within one or more ingress buffers 224. Buffers 224 may be stored in a same or different memory than buffers 244. In embodiments where buffers 224 and 244 are the same, ingress buffers 224 and egress buffers 244 may be different portions of that same memory, allocated to ingress and egress operations, respectively.

An ingress arbiter 220 may release up to a certain number of data units 205 from buffers 224 to an IPP 230 each clock cycle or other defined period of time. The next entry to release may be identified using one or more ingress queues 225, which function similar to egress queues 245. For instance, each ingress port 210 or group of ports 210 may be assigned an ingress queue 225. Ingress queues 225 may be, for example, first-in-first-out queues. That is, when deciding which data unit 205 in an ingress queue 225 to release next, the data unit 205 that has spent the longest time in the ingress queue 225 is selected.

In embodiments with multiple ingress queues 225, the arbiter 220 may utilize a variety of mechanisms to identify the next ingress queue 225 from which to release a data unit 205. For example, each queue 225 may be assigned one or more slots, and the next queue 225 for a given time period may be selected using a round-robin approach that rotates through these slots. As another example, the next queue 225 may be selected using a random, or probabilistic approach. In an embodiment, each ingress queue 225 may be weighted by an advertised transmission rate. For instance, for every one packet released from a queue 225 for a 200 Mbps port, ten might be released from a queue 225 for a 2 Gbps port. The length and/or average age of a queue 225 might also or instead be utilized to prioritize queue selection. In an embodiment, a downstream component may instruct the arbiter 220 to release data units 205 from certain ports. Hybrid approaches may also be used. For example, one of the longest ingress queues 225 may be selected each odd clock cycle, and a random ingress queue 225 may be selected every even clock cycle. In an embodiment, a token-based mechanism is utilized.

In an embodiment, the next ingress queue 225 from which to release a data unit 205 is decided at least partially based on the ports 210 with which the ingress queues 225 are associated. For example, each port 210 may have a different set of ingress queues 225 for the data units 205 that arrive via that port 210. In a given time period, one or more ports 210 may be selected from which to release a data unit 205. The port(s) 210 may be selected using, for example, a weighted round robin algorithm, where ports 210 are provided bandwidth proportional to their port speed. When a port 210 is selected, one or more ingress queues 225 are selected from the set of queues 225 that is associated with the port 210, using any suitable technique. In an embodiment, for instance, queues 225 are selected using a Strict Priority ("SP") algorithm, weighted deficit round robin ("WDRR") algorithm, or a version of Weighted Fair Queuing ("WFQ") algorithm. A data unit 205 (e.g., the head data unit 205), or a portion thereof, is then release from the selected queue 225.

In an embodiment, ingress queues 225 may also or instead exist for specific groups of related traffic, also referred to as priority sets or classes of service. For instance, all data units 205 carrying VoIP traffic might be assigned to a first queue 225, while all data units 205 carrying Storage Area Network ("SAN") traffic might be assigned to a different queue 225. Each of these ingress queues 225 might be weighted differently, so as to prioritize certain types of traffic over other traffic. Moreover, there may be different ingress queues 225 for specific combinations of ports 210 and priority sets.

Data units 205 released by an arbiter 220 are forwarded to an IPP 230 for ingress processing. An arbiter may be coupled to a single IPP 230, or multiple arbiters 220 may share an IPP 230.

Yet other queue selection mechanisms are also possible. The techniques described herein are not specific to any one of these mechanisms, unless otherwise stated. Note that similar selection techniques may also be applied to selecting data units 205 to release from egress queues 245 during egress processing, depending on the embodiment.

In an embodiment, weights, policies, or strategies for these and other such selection mechanisms may be adjusted, for instance, dynamically in response to analyses of state information and/or data unit information for various components of the device.

2.10. Forwarding Logic

The logic by which a device 200 determines how to handle a data unit 205—such as where and whether to send a data unit 205, whether to perform additional processing on a data unit 205, etc.—is referred to as the forwarding logic of the device 200. This forwarding logic is collectively implemented by a variety of the components of the device 200, such as described above. For example, an IPP 230 may be responsible for resolving the destination of a data unit 205 and determining the set of actions/edits to perform on the data unit 205, and an EPP 250 may perform the edits. Or, the EPP 250 may also determine actions and resolve a destination in some cases. Also, there may be embodiments when the IPP 230 performs edits as well.

The forwarding logic may be hard-coded and/or configurable, depending on the embodiment. For example, the forwarding logic of a device 200, or portions thereof, may, in some instances, be at least partially hard-coded into one or more IPPs 230 and/or EPPs 250. As another example, the forwarding logic, or elements thereof, may also be configurable, in that the logic changes over time in response to analyses of state information collected from, or instructions received from, the various components of the device 200 and/or other nodes in the network in which the device 200 is located.

In an embodiment, a device 200 will typically store in its memories one or more forwarding tables (or equivalent structures) that map certain data unit attributes or characteristics to actions to be taken with respect to data units 205 having those attributes or characteristics, such as sending a data unit 205 to a selected path, or processing the data unit 205 using a specified internal component. For instance, such attributes or characteristics may include a Quality-of-Service level specified by the data unit 205 or associated with another characteristic of the data unit 205, a flow control group, an ingress port 210 through which the data unit 205 was received, a tag or label in a packet's header, a source address, a destination address, a packet type, or any other suitable distinguishing property. A traffic manager 240 may, for example, implement logic that reads such a table, determines one or more ports 290 to send a data unit 205 to based on the table, and sends the data unit 205 to an EPP 250 that is coupled to the one or more ports 290.

According to an embodiment, the forwarding tables describe groups of one or more addresses, such as subnets of IPv4 or IPv6 addresses. Each address is an address of a network device on a network, though a network device may have more than one address. Each group is associated with a potentially different set of one or more actions to execute with respect to data units that resolve to (e.g., are directed to) an address within the group. Any suitable set of one or more actions may be associated with a group of addresses, including without limitation, forwarding a message to a specified "next hop," duplicating the message, changing the destination of the message, dropping the message, performing debugging or statistical operations, applying a quality of service policy or flow control policy, and so forth.

For illustrative purposes, these tables are described as "forwarding tables," though it will be recognized that the extent of the action(s) described by the tables may be much greater than simply where to forward the message. For example, in an embodiment, a table may be a basic forwarding table that simply specifies a next hop for each group. In other embodiments, a table may describe one or more complex policies for each group. Moreover, there may be different types of tables for different purposes. For instance, one table may be a basic forwarding table that is compared to the destination address of each packet, while another table may specify policies to apply to packets upon ingress based on their destination (or source) group, and so forth.

In an embodiment, forwarding logic may read port state data for ports 210/290. Port state data may include, for instance, flow control state information describing various traffic flows and associated traffic flow control rules or policies, link status information indicating links that are up or down, port utilization information indicating how ports are being utilized (e.g., utilization percentages, utilization states, etc.). Forwarding logic may be configured to implement the associated rules or policies associated with the flow(s) to which a given packet belongs.

As data units 205 are routed through different nodes in a network, the nodes may, on occasion, discard, fail to send, or fail to receive certain data units 205, thus resulting in the data units 205 failing to reach their intended destination. The act of discarding of a data unit 205, or failing to deliver a data unit 205, is typically referred to as "dropping" the data unit. Instances of dropping a data unit 205, referred to herein as "drops" or "packet loss," may occur for a variety of reasons, such as resource limitations, errors, or deliberate policies. Different components of a device 200 may make the decision to drop a data unit 205 for various reasons. For instance, a traffic manager 240 may determine to drop a data unit 205 because, among other reasons, buffers 244 are overutilized, a queue 245 is over a certain size, and/or a data unit 205 has a certain characteristic.

2.11. Multiple Pipelines

System 200 illustrates only one of many possible arrangements of components configured to provide the functionality described herein. Other arrangements may include fewer, additional, or different components, and the division of work between the components may vary depending on the arrangement. For example, in some embodiments, the ingress arbiter 220 and IPP 230, and/or egress arbiter 260 may be omitted. As another example, there may be any number of ports 210/290.

Though only one EPP 250 and a single traffic manager 240 are depicted in FIG. 2, a device 200 may comprise any number of EPPs 250 and traffic managers 240. For instance, different sets of ports 210 and/or ports 290 may have their own traffic managers 240 and EPPs 250. As another example, in an embodiment, the traffic manager 240 may be duplicated for some or all of the stages of processing a data unit 205. For example, system 200 may include a traffic manager 240 and EPP 250 for an egress stage performed upon a data unit 205 exiting the system 200, and/or a traffic manager 240 and packet processor for any number of intermediate stages. The data unit 205 may thus pass through any number of traffic managers 240 and/or packet processors prior to exiting the system 200. In other embodiments, only a single traffic manager 240 is needed. If intermediate processing is needed, flow of a data unit 205 may "loop back" to the traffic manager 240 for buffering and/or queuing again after each stage of intermediate processing.

In an embodiment, there may be any number of ingress arbiters 220, each with its own set of queues 224 and buffers 225, and any number of IPPs 230. Moreover, the number of IPPs 230 need not necessarily correspond to the number of EPPs 250 within device 200. Nor need the number of EPPs 250 correspond to the number of traffic managers 240 and/or egress arbiters 260.

2.12. Automatic Load Balancing

A network device, such as network device 200 of FIG. 2 or any other switch, router, or network device, may implement ALB techniques to perform path selection operations. In an embodiment, the ALB techniques may be integrated with, or used to enhance, load balancing techniques in connection with path groups based on ECMP, LAG, or other multipath grouping mechanisms. The network device may perform the ALB-based path selection operations using device, path, and/or other statistics collected and generated by the network device under the techniques as described herein.

In an embodiment, the ALB path selection logic and a default path selection logic may be implemented in parallel. Data units having certain characteristics may be designated as ALB-eligible, in that the path selection logic may select paths for the data units using the ALB-selection logic instead of the default path selection logic.

Figure 3A:
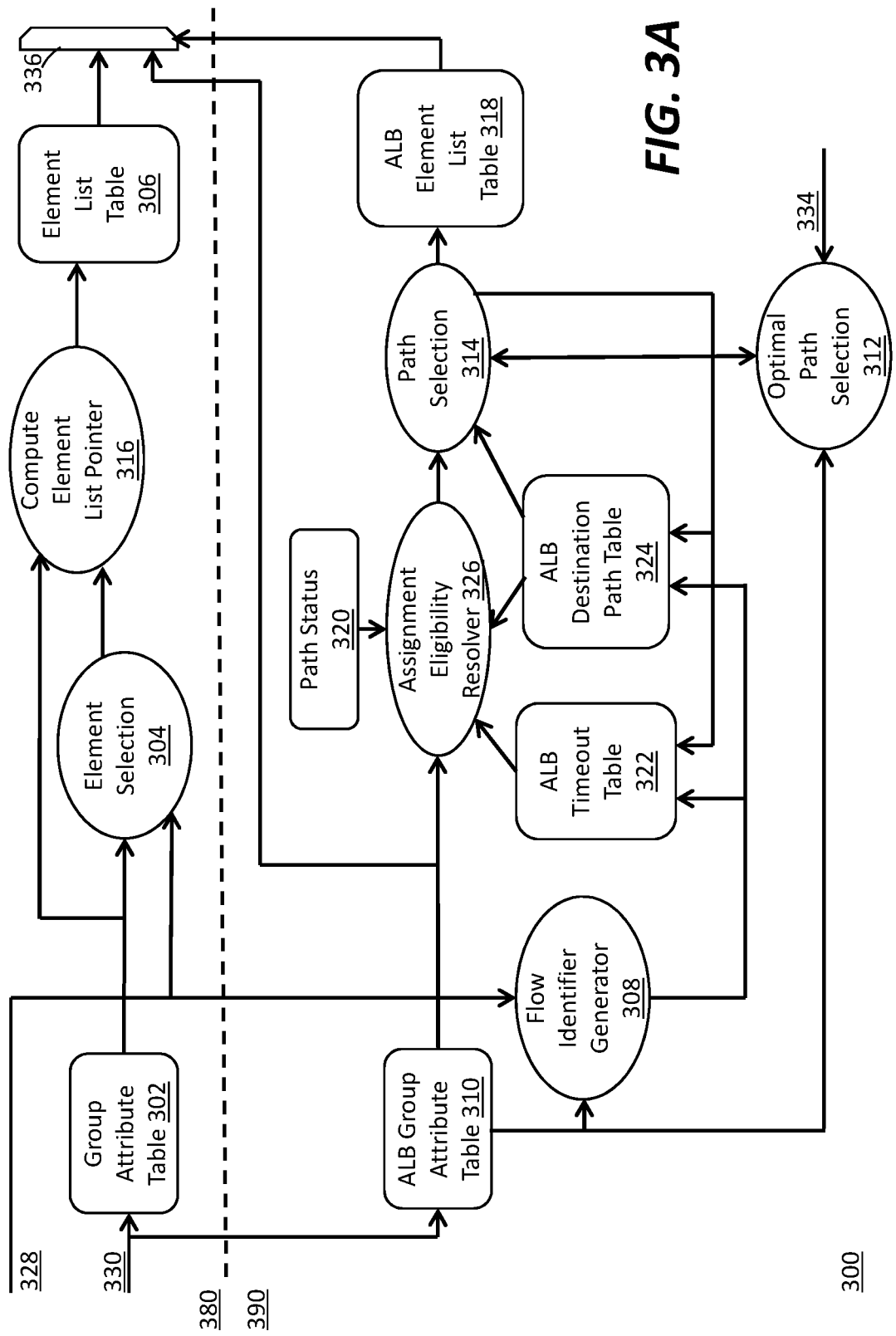
FIG. 3A illustrates an example configuration in which ALB operates side-by-side with hash-based load balancing.

FIG. 3A illustrates an example path resolution logic 300 in which an ALB-based path selection mechanism may be used in place of default load balancing selection mechanism for multi-path groups (e.g., ECMP, LAG, etc.) for a certain amount of traffic in a network device. In some operational scenarios, some or all of the path resolution logic 300 and/or load balancing process flows may be implemented in an ingress packet processor such as IPP 230 of FIG. 2A, or other suitable component of a network device.

Default Path Selection Logic

According to an embodiment, the path selection logic includes a default path selection logic 380, which may be based on a group attribute table 302, such as an ECMP group table or LAG group table. In an embodiment, the group table may be a weighted-cost multi-path ("WCMP") table, such as described in U.S. patent application Ser. No. 15/410,607, filed Jan. 19, 2018, which is hereby incorporated by reference for all purposes, as if set forth in its entirety.

For every arriving data unit, the default path selection logic 380 performs a lookup using a multipath group identifier 330 into a group attribute table 302 to access or otherwise resolve the group attributes of a multipath group of paths by which the arriving data unit may be forwarded. The group identifier may be determined based on one or more attributes associated with or extracted from the arriving data unit, such as by a lookup of a destination address specified in the packet header against a prefix table or other forwarding table.

Using the group identifier 330, attributes of a corresponding multipath group of paths are located in a group attributes table 302. Element selection logic 304 is used to select a specific element (corresponding to a specific path) in the group, such as by using a hash function of various packet header fields, as described elsewhere herein. Path resolution logic 316 locates corresponding path information in an element list table 306 by computing a pointer to a specific index in the element list table 306 where the path information may be found. The path selection logic then uses this path information to determine where to forward the data unit (e.g., a specific egress port, internal component, traffic manager, etc.).

Of course, in other embodiments, the default selection logic 380 may take other forms and/or be implemented in varying manners. For instance, the default path selection logic 380 need not necessarily even implement load-balancing. In yet other embodiments, the default selection logic 380 may be omitted entirely.

ALB Flow Identification

In addition to or in place of the default load balancing logic, as discussed above, data units with certain characteristics deemed to render them eligible for ALB-based path selection may instead be assigned paths using ALB path selection logic 390. For instance, traffic associated with multipath group identifiers in a specific range(s) may be forwarded using a path selection determined by ALB operations as described herein. These ALB operations may include, but are not necessarily limited to only, some or all of: ALB flow identification, ALB flow categorization, ALB flow assignment, and optimal ALB path selection.

The ALB flow identification operations may resolve a data unit to a specific ALB group. The ALB group may be, for instance, the same as the multipath group 330 identified for the data unit's destination using the default path selection logic 380. In some embodiments, there may optionally be different ALB groups for the same destination, but different data unit attributes. For example, the ALB group may be a combination of the multipath group identifier 330 for the destination of the data unit and some attribute of the data unit, such as a flow type. For instance, there may be different ALB groups for data units directed to the same destination, but having a "lossy" traffic flow class, a "lossless" traffic flow class, or other classes.

The ALB flow identification operation may, in some embodiments, then check to see if the ALB group determined for an arriving data unit is eligible for further ALB operations. This may involve, for instance, determining if the ALB group identifier for the data unit is in a set or range of values that has been marked as being ALB-eligible. The ALB group identifier may be specifically marked as eligible in, for instance, the ALB group attribute table, or ranges of ALB identifiers (or multipath group identifiers 330) may be marked as eligible. An ALB group may have been marked as eligible, for instance, manually by a system administrator or automatically in response to various conditions. For groups that are not eligible, the default path selection logic 380 is used to select a path for the data unit, whereas otherwise the ALB selection logic 390 is utilized. In some embodiments, all multipath groups are ALB-eligible, and thus this check may be skipped.

For example, as depicted in FIG. 3, using the group identifier 330 (and optionally the flow type) for the arriving data unit, a lookup into an ALB group attribute table 310 is performed to resolve ALB group attributes applicable for the ALB group to which the arriving data unit belongs. The ALB group attributes for the data unit, as resolved from the ALB group attribute table 310, can be used to determine whether the arriving data unit is enabled or eligible for further ALB operations.

In an embodiment, in response to determining, based in whole or in part on the ALB group attributes for the data unit, that ALB is to be performed, the network device may enable further ALB operations for the arriving data unit. Additionally, optionally or alternatively, a path selector switch 336 can be enabled to output a selected path as determined by the ALB path selection logic 390; the path selector switch 336 can be (mutually exclusively) disabled from outputting a selected path as determined by the default path selection logic 380 as previously described.

On the other hand, in response to determining, based in whole or in part on the ALB group attributes for the data unit, that ALB is not to be performed, the network device may disable further ALB operations for the arriving data unit. Additionally, optionally or alternatively, the path selector switch 336 can be disabled from outputting a selected path, if any, from the ALB path selection logic 390; the path selector switch 336 can be (mutually exclusively) enabled to output a selected as determined by the default load balancing 380 previously described.

For arriving data units belonging to ALB groups determined to be ALB-enabled, a flow identifier generator 308 identifies the ALB flow to which the data unit is assigned. For example, an ALB flow identifier may be computed based on various data unit attributes (e.g., fields of the packet header, such as described previously), using hash-based or other mechanisms such as described elsewhere herein. The ALB flow identifier may also optionally be computed based on one or more ALB group attributes resolved or retrieved from the ALB group attributes table 310. For example, a set of individual flow identifiers computed using data unit attributes may be aggregated into a single ALB flow based on ranges of identifiers, modulo-based buckets, or other mapping mechanisms indicated by the one or more ALB group attributes. Moreover, in an embodiment, an individual flow identifier or aggregated flow identifier may be adapted so as to be unique across all ALB groups, such as by adding an offset associated with the ALB group or appending an ALB group identifier.

The ALB flow identifier may or may not be the same as a flow identifier (e.g., ECMP identifier, LAG identifier, etc.) generated by the default path selection logic 380. Additionally, optionally or alternatively, the ALB flow identifier may or may not be generated from the same attributes (e.g., five-tuple attributes, a set of source and destination IP addresses, source and destination IP ports and protocol, etc.) of data units used to generate the flow identifier for the default path selection logic 380.

In an embodiment, the ALB flow identifier is calculated as a function of: (a) a hash value computed with a hash function (which computes or produces a hash value based on a given hash key) from selected data fields (representing a hash key) of each arriving data unit; (b) an ALB group base pointer; and (c) a ALB group flow count attribute, the latter two of which may be stored in, for instance, the ALB group attribute table 310. The ALB group flow count attribute may be a per-ALB-group attribute for each ALB group, which indicates the number of ALB flows that exist for the group, thus controlling the granularity at which flows are managed for the group.

The function may be, for instance, to sum the ALB group base pointer with the result of a modulo operation between the hash value and the ALB group flow count attribute. Example traffic flow types to be managed in an ALB group may include, but are not necessarily limited to only, any of: one or more lossy flow types, one or more lossless flow types, and so forth. A traffic flow type may be, but is not necessarily, specified with a flow-type attribute value in an ALB or non-ALB configuration table accessible to the ALB operations.

Figure 4A:
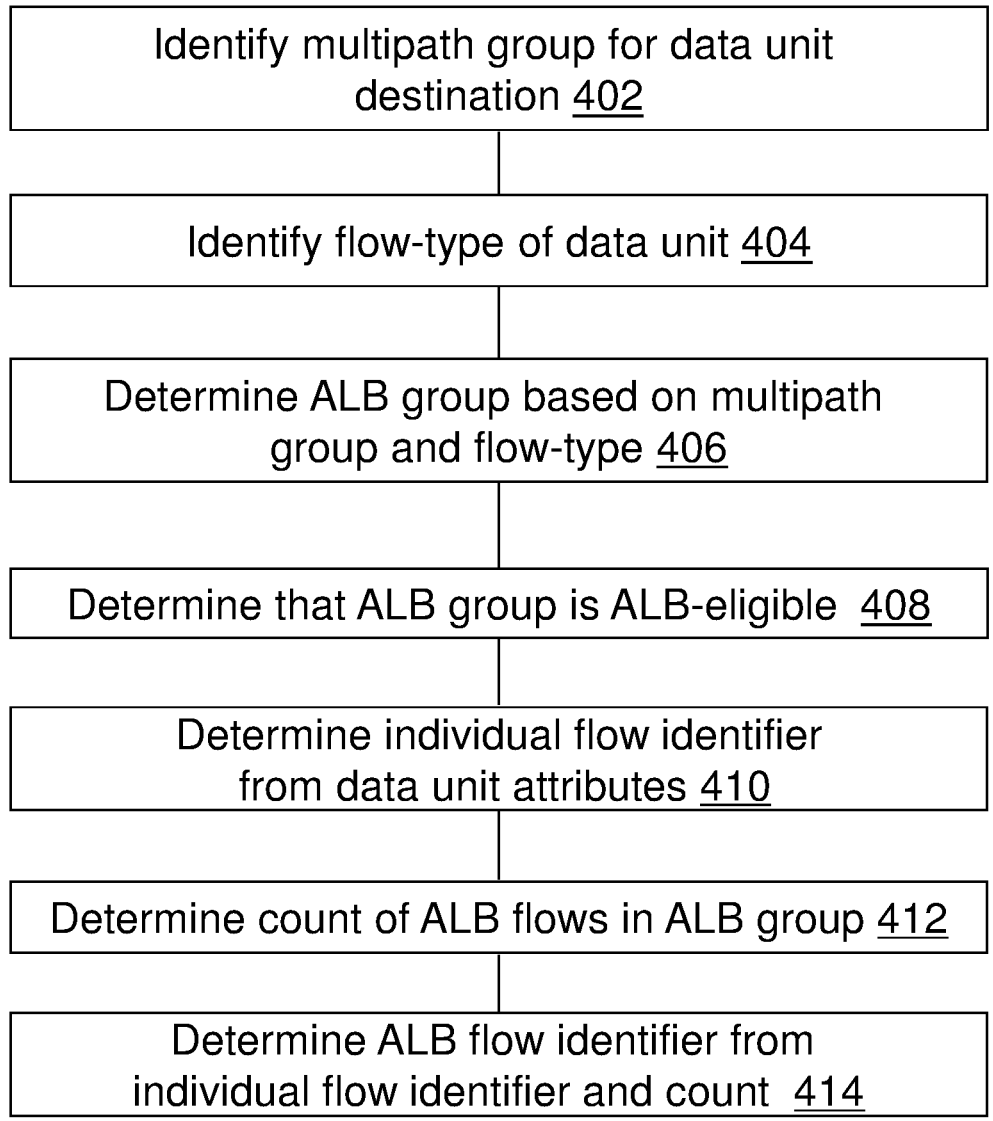
FIG. 4A through FIG. 4C illustrates example process flows.

FIG. 4A illustrates an example ALB flow identification process flow 400A for a data unit, which may be performed, for example by path selection logic within one or more components within a network device, such as one or more of a packet processor or traffic manager. Flow 400A may be performed by the example path resolution logic 300 and/or in a variety of other contexts. Flow 400A is but one example for identifying an ALB flow, and other flows may include additional, different, or fewer elements in varying arrangements.

Block 402 comprises identifying a multipath group for the destination of the data unit, as described elsewhere herein. Block 404 comprises identifying a flow type of the data unit. The flow type may be based on any suitable characteristics of the data unit, and in one embodiment may be related to a class of traffic (e.g., lossy versus lossless). Block 406 comprises determining an ALB group identifier based on the foregoing, such as by concatenating an identifier of the multipath group with an identifier of the flow type.

Block 408 comprises determining if the ALB group is ALB-eligible, as described elsewhere herein. This determination may be optional, in some embodiments. If the ALB group is ALB-eligible, then in block 410, an individual flow identifier is determined for the data unit, such as described elsewhere herein. Block 412 comprises determining a count of ALB flows in the ALB group 412, such as by a lookup on attributes of the group in a group attribute table. Block 414 comprises determining an ALB flow identifier based on the individual flow identifier and count of ALB flows in the ALB group 412, such as by taking the result of a modulo operation between the individual flow identifier and the count. Optionally, an offset may be added to the result of the modulo operation.

ALB Flow Categorization

An assignment eligibility resolver 326 may perform ALB flow categorization operations to determine whether an ALB-eligible arriving data unit can be assigned to an optimal path (also referred to as "optimal path candidate") identified by the ALB path selection logic 390 of the network device. More specifically, a computed ALB flow identifier as described herein may be used to resolve both an ALB flow timeout and a previously assigned path for the ALB flow. For instance, the ALB flow categorization may perform a lookup for this information on an ALB timeout table 322 and an ALB destination path table 324, respectively.

The ALB flow timeout may be a time value stored directly in the ALB timeout table 322, or may be calculated from a time value in ALB timeout table 322 plus a timeout threshold, depending on whether such a timeout threshold was added to the time value before it was stored. The ALB flow timeout may be compared to the current time maintained by the network device to determine whether the ALB flow is active (e.g., if the current time is less than or equal to the ALB flow timeout), or whether the ALB flow is inactive (e.g., if the current time is greater than the ALB flow timeout). If the ALB flow is inactive, it can therefore be assigned to a new path while minimal, if any, risk of packet re-ordering. The assigned path indicates the path to which the ALB flow is currently assigned, which will be used in the event that the ALB flow cannot be assigned to a new path without unreasonable risk of packet re-ordering.

The time value for the ALB flow in the ALB timeout table 322 is updated to reflect the arrival of a data unit in the ALB flow, to indicate ALB timeout-related information of the ALB flow to the next round of new path assignment eligibility determinations for the ALB flow. The time value may be, for instance, the sum of a timestamp representing a receipt time of the data unit by the network device or a specific component therein and a default timeout threshold. In an embodiment, the default timeout threshold may be global for all flows. In other embodiments, the timeout threshold may be specific to an ALB group or even an ALB flow. The assigned path may be updated by ALB flow assignment operations whenever a new path assignment decision for the ALB flow has been made.

The assignment eligibility resolver 326 may send or provide, to an ALB path selector 314, an indication of whether the ALB flow is eligible for a new path assignment (e.g., an indicator indicating that the ALB flow is inactive, assignment-eligible, etc.), as determined from the ALB flow timeout. The assignment eligibility resolver 326 may also send or provide, to an ALB path selector 314, the identifier of the previously assigned path, identifying the assigned path that was most recently used for prior data units belonging to this ALB flow just prior to the new data unit arriving (at least in the case of the ALB flow not being eligible for a new path assignment).

In an embodiment, ALB operations may further comprise a process to manage timeout rollover. As mentioned, an ALB flow of an arriving data unit may be deemed eligible for a new path assignment whenever a current time of the arriving data unit is greater than (e.g., lapses beyond, etc.) the ALB flow timeout.

To reduce memory usage, the ALB flow timeout and/or the current system time may be represented using values of a relatively limited scope. The scope may be capable of indicating a time only within a limited time range (e.g., an hour, a period of a roughly million clock cycles, etc.). If the maximum time value capable of representation is reached, a new time recordation period begins, with time values rolling over to the minimum value capable of representation.

Given that an ALB flow can become inactive for an indeterminant amount of time, it may not always be possible to ascertain whether the current ALB flow timeout reflects a time value that was recorded before or after such a maximum time value was most recently reached. That is, it may not be possible to ascertain just from a comparison of the current time value to the ALB flow timeout whether the timeout period for the ALB has lapsed. Hence, after a long idle period, an ALB flow may be incorrectly perceived as active due to a rollover of time values.

To handle timeout rollover, a background timeout rollover management process may scan an ALB timeout table (e.g., ALB timeout table 322) and mark entries in the ALB timeout table as inactive after some period of time. An ALB flow marked as inactive is treated as being inactive, regardless of the ALB flow timeout.

In an embodiment, to support optimized access, the timeout table may be physically organized into two separate structures. The first memory structure comprises, for each ALB flow, an ALB activity indicator and upper bits of the ALB flow time value. The first memory structure supports three concurrent accesses as follows. The first memory structure may be read on data unit arrival to determine eligibility for a new path assignment for the ALB flow. The first memory structure may be written to on data unit arrival to update the time value associated with the ALB flow. Finally, a background timeout rollover management process may perform Read-Modify-Write operations to mark entries as inactive after a relatively long idle period.

The rollover management process periodically or at other intervals reads an entry from the first memory structure and compares the selected upper bits of the time value (or a timeout calculated therefrom) to corresponding selected bits of the current time. In response to determining that the selected bits of the current time are greater than the selected bits of the time value, the background process may clear the ALB activity indicator, thus indicating that the ALB flow is inactive.

The remaining bits of the ALB flow time value are stored in a second memory structure separately from the foregoing, requiring only two concurrent accesses. Specifically, the second memory structure may be read on data unit arrival to determine the corresponding ALB flow's eligibility for a new path assignment, and written to on the data unit arrival to update the time value associated with the ALB flow.

In an embodiment, a data unit may further or alternatively be identified for a new path assignment instead of the existing path assignment if the path to which the data unit was previously assigned is invalid. For instance, a path status table 320 may be consulted to determine whether the path is currently enabled or disabled. A path may be disabled, for instance, if the port associated with the path is down, or the corresponding link has otherwise been disabled. In such cases, failover to a new path is needed, and thus the ALB flow should be marked as eligible for a new path assignment.

Path State Collection

In an embodiment, a network device comprises one or more path state monitors that maintain various state related measures. The measures may include, for example, delay-based measures, such as queue delay, queue size, port delay, path delay, etc. Path measures of an egress port loading or utilization, logical port loading, or path loading, with respect to the target for the path, may also be maintained and used in an optimal path selection decision process. Secondary states may be maintained and included in the selection decision process, including the port status (up or down) and flow control status (queue or port flow controlled). Resource usage, such as queue length (in cells, bytes or packets), port length (in cells, bytes or packets), total buffer or partition usage (in cells, bytes or packets), and so forth, can also be maintained and added to the selection process to avoid packet loss.

In an embodiment, the path state monitors may maintain a plurality of EPP-originated measures, including but not limited an instantaneous port loading that indicates a ratio of bytes transmitted to maximum number of bytes that could be transmitted over some unit of time (e.g., every second, every ten seconds, every 60 seconds, etc.). Additionally, optionally or alternatively, other EPP-originated measures such as average port loading may also be maintained by the path state monitors.

In an embodiment, some or all the EPP-originated measures as maintained by the EPPs 250 can be sent or provided by the EPPs 250 to one or more TMs 240 or one or more path state broadcasters. In response, the TMs 240 may combine the EPP-originated measures with TM-originated measures before transmitting or broadcasting these EPP-originated and TM-originated measures to IPPs 230, via an ALB statistics interface.

The measures transmitted or broadcasted to the IPPs 230 or path state resolvers implemented in the network device may comprise some or all of: delay-based measures (e.g., queue delay, port delay, path delay, etc.), path measures of an egress port loading or utilization, logical port loading, path loading with respect to the target for the path, port status (up or down), flow control status (queue or port flow controlled), queue length (in cells, bytes or packets), port length (in cells, bytes or packets), total buffer or partition usage (in cells, bytes or packets), etc. Additional measures transmitted or broadcasted to the IPPs 230 or the path state resolvers may include delay measures for one or more queue groups per port. Example delay measures for a queue group per port may include, but are not necessarily limited to only, some or all of: instantaneous queue delay, maximum instantaneous delay observed in an egress queue or across a given egress queue group (e.g., of an egress port, etc.), average queue delay, maximum average delay observed in a egress queue or across a given egress queue group (e.g., of an egress port, etc.), and so forth.

These and other measures may be supplied to ALB path selection logic on a per path basis by operations of respective blocks such as path state monitors, path state broadcasters, path state resolvers, and so forth. Values for some or all of these monitored measures can be quantized, prior to transmission.

In an embodiment, upon reception by the IPPs 230, the values of the per-path (e.g., per-egress-port, per-next-hop, etc.) measures may be stored by the IPPs 230 into a delay-based or loading-based data structure. For example, some or all of the delay values may be stored in a delay-based data structure, wherein some or all of the loading values may be stored in a loading-based data structure.

In some operational scenarios, path state resolvers (or path state resolution logics) each maintains or implements a path state resolver (e.g., as a finite state machine) that iterates over each unique combination of ALB group and path to resolve, based on the values of the measures observed on the per-path basis, a current or last known path condition of each path.

For example, the iteration over each unique combination of ALB group and path may be performed by first resolving or determining a set of paths that are enabled for the ALB group via a lookup into an ALB path condition configuration table using the ALB group identifier of the ALB group as an index or lookup key. The ALB path condition configuration table may contain a bitmap indicating, for each path in the ALB group, whether the path is enabled or not. Additionally, optionally or alternatively, the ALB path condition configuration table may contain a measure selection specifying a specific combination of delay and loading measures to use for the ALB group. Additionally, optionally or alternatively, the ALB path condition configuration table may contain a path condition profile specifying how the unfiltered path condition may be mapped to a corresponding path state value, the latter of which is to be used in ALB operations for a given unique combination of ALB group and path (e.g., egress port, next hop, etc.).

Upon obtaining the bitmap, the path state resolver searches the bitmap to find a current enabled path (initially the first enabled path). The path state resolver computes an index or lookup key for the current enabled path and uses the index or lookup key to lookup load and delay measure values based at least in part on the specific combination of configured measures for the ALB group as defined by the measure selection attribute.

A load measure address used in looking up load measure values may be the path identifiers for all load measure values as associated with or identified by a specific value of the measure selection attribute value. A delay measure address used in looking up delay measure values may be determined based at least in part on the path identifier.

At the same time the delay and load measure lookups are performed, a lookup of weights for the delay and load measures may be made by the path state resolver into an ALB weight table. Once the delay and load measure weights and the corresponding delay and load measure values are obtained, an unfiltered path condition for the path may be computed by the path state resolver as a weighted sum of the delay and load measure. This unfiltered path condition for the path can be combined with a path condition profile for the path to form a path condition filter address, for example through a bitwise "or" operation.

Thus, a combination of the path condition profile, the delay and load weights and the delay and load measure values can be determined to generate mappings of unfiltered path conditions to path states. The path condition filter address may serve as an index or lookup key into an ALB condition filter table that produces the path state.

In yet other embodiments, a path state value of a path may be resolved from the observed measures in a variety of other manners, such as via functions of the observed measures and/or other lookup tables. In any case, a resolved path state value for each path, or each specific combination of an ALB group and path, may be sent to optimal path selection logic 312 of FIG. 3A.

Optimal Path Selection

Generally speaking, for a given ALB flow associated with a given ALB group, the optimal path selection logic 312 selects a path, from the set of paths that is associated with the ALB group (e.g., the multipath group), that is currently deemed to be optimal for the ALB flow, in view of path state information 334 and/or other considerations. The optimal path may be, for instance, a path with a best path state value, as determined above. As path states change from time to time, so too will the optimal path selected by the optimal path selection logic 312.

In an embodiment, the optimal path candidate selection logic 312 may be designed to correct for present imbalances observed across paths by biasing or favoring selections of paths assigned to an ALB group based on the following objective. The frequency of assignments of flows to paths that have heavy loading and/or high delay should be decreased, while the frequency of assignments of flows to paths that have low loading and/or low delay should be increased.

A path with the best path state need not necessarily be the optimal path that is selected. In an embodiment, for instance, the optimal path may be selected from a group of best paths based on other selection mechanisms (e.g., random, round robin, etc.). Or, the optimal path may be selected probabilistically based on path weights corresponding to the path states.

In an embodiment, determining the optimal path can be achieved in part using a path selection sequence for paths of the ALB group. The path selection sequence comprises a sequence of elements in which each sequence entry is a distinct combination of a path in the ALB group and a corresponding path state value of the path. The optimal path candidate selection logic 312 may perform a path selection process that iterates over each sequence entry in the path selection sequence in rounds and, during each round, selects sequence entries in the path selection sequence in a round-robin order.

Biasing or favoring selections of paths of an ALB group may be achieved by marking some sequence entries in the path selection sequence as ineligible for one or more rounds based on their corresponding path states as indicated in the sequence entries. For example, larger path states values may be assigned to paths with better conditions. A path with a relatively large path state value may be eligible for selection in more rounds iterated through the path selection sequence than a path with a relatively small path state/condition value.

In an embodiment, for example, in each round, only valid paths in the path sequence with a path state value above a certain path state value threshold may be selected. The path state value threshold may be adjusted each round. In the first round, the path state value may be initialized to a maximum value. The maximum value may be fixed, or the maximum value may correspond to, for instance, the highest path state value of any path in the ALB group. In successive rounds, the threshold may be lowered until reaching a round with a minimum threshold value, after which the threshold may be reset to the original threshold value of the first round. The threshold may be lowered each round, each other round, or at other intervals.

Alternatively, rather than skipping invalid paths and/or paths below a threshold in the sequence, the sequence may be reformed after each round to only include only valid paths whose path state value is above the threshold for the round. Or, the sequence may be sorted based on the current path state, and the round may end when a sequence entry lower than the round threshold is reached.

Figure 4B:
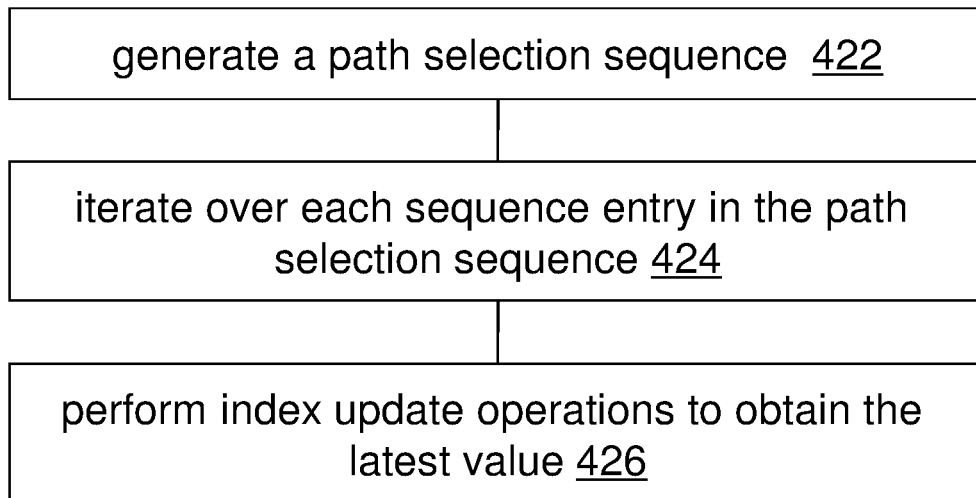

FIG. 4B illustrates an example process flow 400B for constructing a path selection sequence and selecting/determining the optimal path identifier from the generated path selection sequence. Flow 400B may be performed, for example by path selection logic within one or more components within a network device, such as one or more of a packet processor or traffic manager. Flow 400B may be performed by the example path resolution logic 300 and/or in a variety of other contexts. Flow 400B is but one example for selecting an optimal path, and other flows may include additional or fewer elements in varying arrangements.

Figure 3B:
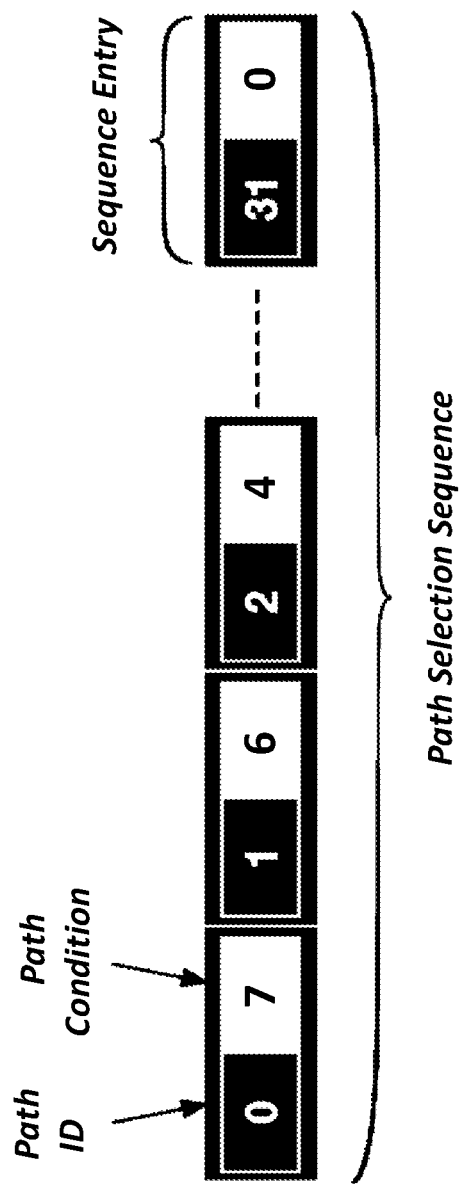
FIG. 3B illustrates an example path selection sequence.

Block 422 comprises performing a path selection sequence generation process to generate a path selection sequence as illustrated in FIG. 3B. The per-path path state information is received for each unique combination of ALB group and path, for example serially, from path state resolution logic such as previously discussed. The received path state is cached or stored to construct the path selection sequence of FIG. 3B, where each sequence entry in the path selection sequence includes a path identifier for a path of the ALB group and a corresponding path state value for the path. The path state value reflects the path condition for the path. For instance, the larger the value of the path state, the better condition the path may be in.

In some operational scenarios, the path selection sequence is constructed upon receiving the updated path state information from the path state resolution logic and is written as a cached sequence upon processing the final path in the ALB group.

To support the optimal path candidate selection, the path selection sequence generation process can track, for a given ALB group, the maximum path state value which the selection sequence generation process has observed, and store the maximum path state value in an attribute (e.g., the max group round count depicted in FIG. 3C) upon processing the final path in the ALB group.

Block 424 comprises performing the path selection process to iterate over each sequence entry in the path selection sequence in a round robin order. To iterate through the sequence entries, a round robin index is maintained for the path selection sequence per ALB group, and is updated on every new path assignment (or path assignment update) for an ALB flow in the ALB group. The round robin index may be maintained in any suitable data or memory structure.

The optimal path identifier is resolved or determined by inspecting the n-th sequence entry in the path selection sequence (where n is equal to the round robin index), and by sending the path identifier contained in the selected n-th sequence entry to the ALB path selection logic 314.

Figure 3C:
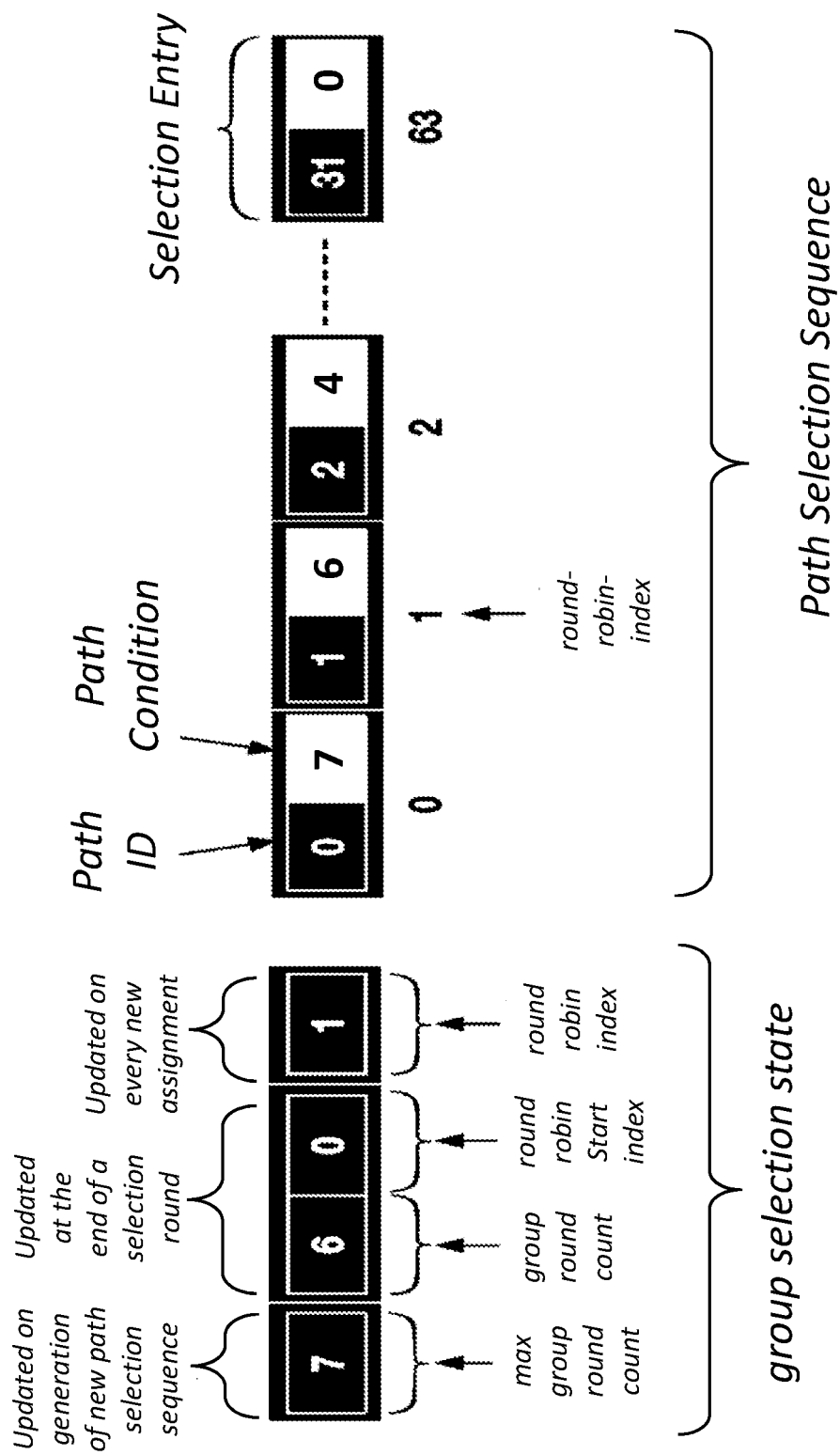
FIG. 3C illustrates an example group selection state.

FIG. 3C illustrates example group selection state information with a round robin index of a value of one, which points to a sequence entry in a path selection sequence comprising 64 sequence entries. The sequence entry to which the round robin index in the group selection state points comprises a path identifier of one and a path state value of six. The current round may start at a sequence entry as indicated by a round robin start index in the group selection state. As shown in FIG. 3C, the group selection state further comprises a max group round count and group round count. In some operational scenarios, the max group round count in the group selection state is updated on generation of a new path selection sequence. The ground round count and round robin start index are updated at the end of a selection round. The round robin index is updated on every new assignment, which results in a new optimal path candidate to be selected as a path for the next time the assigned path for the ALB flow is updated as described herein.

Lookup operations used to resolve the optimal path identifier may be performed to obtain the group selection state as illustrated in FIG. 3C with the ALB group identifier, retrieve the round robin index from the group selection state, use the round robin index to retrieve the optimal path identifier from the path selection sequence, and so forth.

Block 426 comprises performing round robin index update operations on the round robin index to obtain the latest value. In some operational scenarios, the path selection process utilizes a previously updated value of the round robin index that was updated on a prior clock cycle for the purpose of determining or identifying whether a path (as pointed to by the previously updated value of the round-robin index) is both eligible and optimal. Hence, the optimal path selection logic (or algorithm) may utilize the round-robin index update operations to resolve an updated value of the round robin index at each clock cycle (or at other intervals), which updated value points to an optimal path for use in the next path selection.

To determine whether a given path in the paths of the path selection sequence is valid and optimal, each sequence entry of the path selection sequence may be evaluated in parallel to determine whether each such sequence entry satisfies a set of path validity conditions and sets a respective bit in a bitmap corresponding to the sequence entry or an identifier of the sequence entry. Example path validity conditions in the set of port validity conditions may include, without limitation, valid path resolution and optimal path resolution. For valid path resolution, the path identifier contained in the sequence entry must be a valid path indicator. Invalid sequence entries in the path selection sequence may be marked with an invalid path indicator. For optimal path resolution, the path state value contained in the sequence entry must be greater than or equal to the group round count maintained for the ALB group. The group round count is a counter that indicates how many times each sequence entry in the path selection sequence has been visited.

Once a bitmap identifying the sequence entries in the path selection sequence that are both valid and optimal has been produced, the bitmap is searched to find the next valid and optimal sequence entry, starting from the current value of the round robin index. If a new path assignment is needed for a given flow (e.g., if the flow was determined to be inactive or the path currently assigned to the flow has failed), then the round robin index may be set to the next valid and optimal sequence entry. Otherwise, the round robin index remains unchanged.

The group round count may be updated at the end of each path selection round, where a path selection round is considered to be a complete iteration through each valid and optimal sequence entry in the path selection-sequence, with no sequence entry visited more than once in a given round, etc. Each round is considered complete when the updated round robin index equals or returns to the round robin start index as maintained by the selection group state for the ALB group, and an optimal path is determined to be used for forwarding for the flow.

The group round count is updated at the end or completion of a round according to a policy specified by a round count update type. The round count update type may be determined, for instance, by a lookup into an ALB selection group configuration table.

Under the optimal port first policy, the following processing or operations may be performed. The group round count is decremented until it equals a round count limit. The round count limit may be provided with a look up to the ALB selection group configuration table, at which point the group round count is set to the max group round count maintained in or lookup from the selection group state. This policy ensures that paths with the best path condition are selected first, while the paths with the worst path condition are serviced last or not at all depending on the setting of the round count limit.

Under the even-then-optimal policy, the following processing or operations may be performed. The group round count is incremented until it equals a max group round count maintained in or lookup from the selection group state, at which point the group round count is set to the round count limit. This policy ensures that assignments are initially distributed evenly to paths whose path condition has a value that is equal to the round count limit or better. As new flows arrive, new flows will gradually be assigned to paths having the best path condition.

In an embodiment, both the path state resolver and path selection logic may access and update of the round robin index for a given ALB group, sometimes concurrently. In such cases, the path state resolver may be given priority over any updates by the path selection logic as the path selection sequence may be changed so that one or more paths become eligible or ineligible for path selection, for example based on whether a corresponding egress port is up or down (operationally) and/or based on updates to path conditions of the paths.

It has been described that ALB operations as described herein may be performed for paths of a multi-path group such as an ECMP or LAG group. It should be noted that, in other embodiments, some or all ALB techniques as described herein may be implemented to operate with a non-ECMP or non-LAG group. For example, ALB operations may be performed with respect to an ALB group that comprises a plurality of paths that may or may not represent equal cost multi-paths. In addition, ALB operations may be performed with a plurality of paths in multiple parallel groups.

Flow Assignment

Based on the ALB flow categorization operations, a path selector 314 determines whether, for an arriving data unit, the ALB path selection logic 390 selects the previously assigned path for the ALB flow to which the data unit belongs, or a new optimal path selected by the optimal path selection logic 312. The path selector 314 selects the former if the resolver 326 indicates that the ALB flow is not eligible for a new path assignment, and selects the latter otherwise. The path selector 314 may output an identifier of the selected path to the path selector switch 336 switch directly, or identify an index into an ALB element list table 318 to retrieve the necessary path identification information to output to the path selector switch 336.

According to an embodiment, ALB flows may be reassigned to new paths using a background process. The background process evaluates each ALB flow periodically, or at other intervals, to determine if the ALB flow is inactive. For instance, the background process may determine if the current time of an ALB flow that is marked as active is now greater than its timeout period. If so, the background process may pro-actively select a new path for the ALB flow (which may or may not be the previously assigned path), using optimal path selection logic such as described above. The new path may overwrite the path previously assigned to the ALB flow in the ALB destination path table 324.

In an embodiment, such background reassignment of ALB flows to new paths may occur in addition to new path assignments that occur in response to receiving data units belonging to those flows. In another embodiment, background reassignment of ALB flows may be used exclusively, such that incoming data units are always assigned to the path listed for their corresponding ALB flows in the ALB timeout table 322.

2.13. Device Control Logic

According to an embodiment, a network device may comprise device control logic configured to adjust various settings of the device. The device control logic may include one or more control interfaces by which it may receive instructions to make the adjustments. For instance, the device control logic may include a user interface, such as a command line interface, or graphical user interface. In an embodiment, the device control logic may include one or more application program interfaces ("APIs") by which it may receive instructions. Such instructions may be received directly from a coupled data collector, report processor, or analyzer. In an embodiment, such instructions may be relayed from an analyzer device through the data collector.

Such settings may include, for instance, voltages or operating frequencies of various device components, including memories, processors, or and/or other hardware within the device. Voltage changes or frequency changes may be made for all components, all components of a certain class (e.g., all packet processors, or all traffic manager buffers), all components in a certain pipeline, or specific sets of components (e.g., a specific buffer, packet processor, or port). Settings may further include, for instance, the application of certain flow control or traffic shaping policies. Settings may further include weights assigned to queues (e.g., how often a certain queue releases data units to a packet processor), flows (e.g., the priority of a certain flow of traffic), or classes of traffic (e.g., how frequently multicast traffic should be dropped). Settings may further include amounts of buffer space allocated to traffic flows, ports, queues, or other entities at one or more components. Settings may further include whether a certain port or other component is active. Settings may further include changes to paths and forwarding tables.

In an embodiment, the device control logic may be a centralized component responsible for adjusting settings across the entire device. In another embodiment, the device control logic may be distributed amongst the various other components of the device. For instance, each component of the device may have its own device control logic.

2.14. Miscellaneous

Device 200 and path resolution logic 300 illustrate only some examples of contexts in which the techniques described herein may be practiced. Other suitable devices and other suitable path selection logics may include fewer and/or additional components in varying arrangements. Moreover, while only one pipeline of components is depicted for device 200, there may be any number of pipelines, each associated with a different set of ports, and each interconnected.

Example architectures for a network device 200 are further described in, without limitation, U.S. patent application Ser. No. 15/433,825, filed Feb. 15, 2017, U.S. patent application Ser. No. 16/033,680, filed Jul. 12, 2018, and U.S. patent application Ser. No. 16/057,354, filed Aug. 7, 2018, the entire contents of each of which are hereby incorporated by reference for all purposes, as if set forth herein. Although any mechanism may be used for monitoring and generating state information, some examples of flexible such mechanisms, adapted for use inside such network architectures are the Programmable Visibility Engines described in U.S. patent application Ser. No. 15/410,651, filed Jan. 19, 2017, the entire contents of each of which are hereby incorporated by reference for all purposes, as if set forth herein.

For simplification, the traffic managers, packet processors, arbiters, and other components are on occasion described herein as acting upon or with respect to a data unit, when in fact only a portion of the data unit may be sent to or otherwise available to the component. For instance, a packet processor may be said to process a data unit, when in fact only the data unit control portion is available to the packet processor. In such contexts, it will be understood that the information about the data unit that is actually available to the component is a representation of the data unit to that component. Any actions described herein as having been taken by the component on or with respect to the data unit may occur with respect to the representation of the data unit, and not necessarily the complete data unit.

3.0. Functional Overview

Figure 4C:
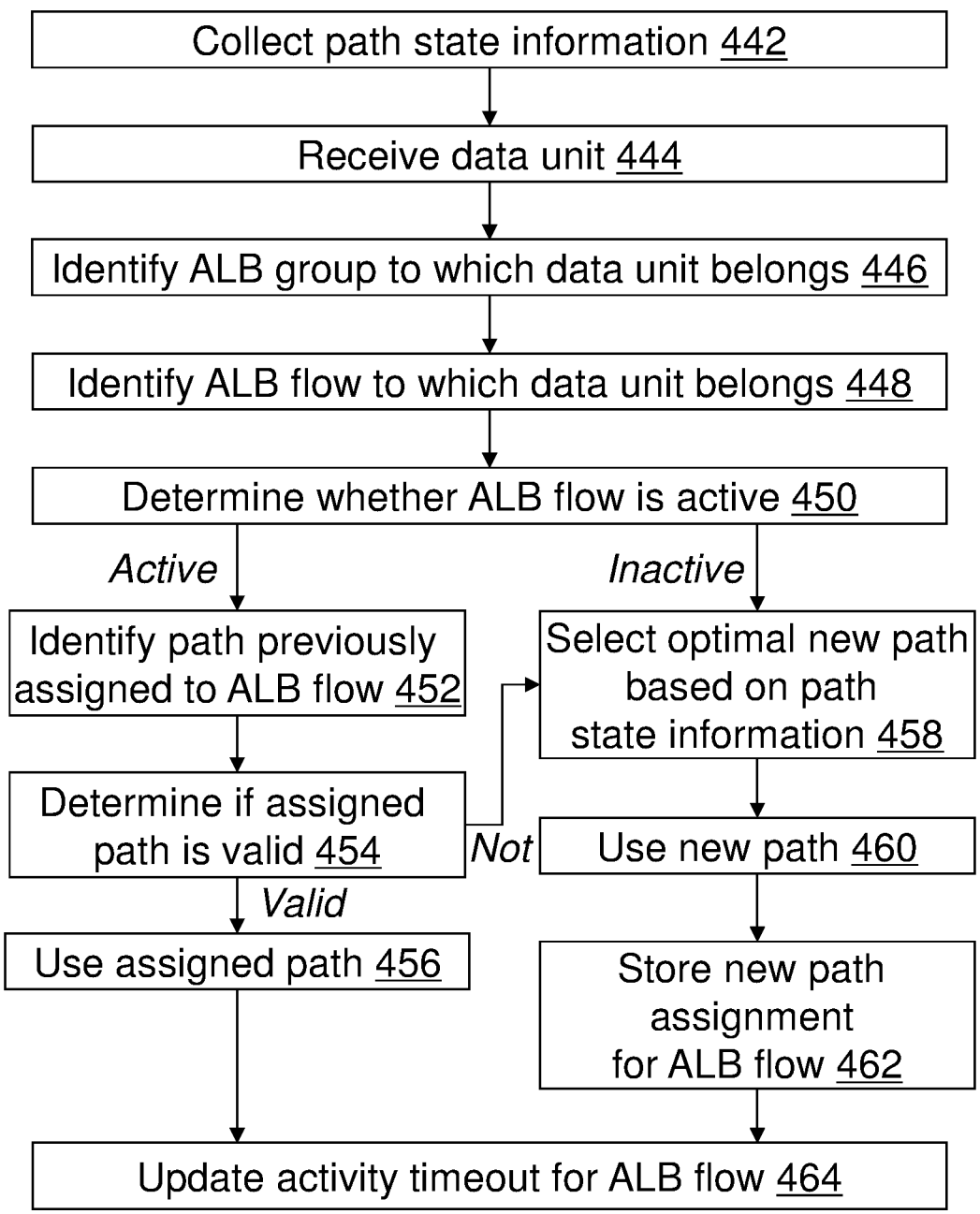

FIG. 4C illustrates an example process flow 400C for selecting a path for a data unit, according to an embodiment. The various elements of flow 400C described below may be performed by components of a network device implemented with one or more computing devices, such as by the ALB path selection logic 390 described above or any other suitable path selection logic. In an embodiment, the path selection logic may be in each ingress packet processor within the network device, while in other embodiments the path selection logic may be in a traffic manager or other component. Flow 400C may be performed any number of times by a network device with respect to different data units that the network device receives, potentially concurrently by any number of parallel components of the network device.

Block 442 comprises collecting path state information. The path state information may include a variety of metrics collected in a variety of manners. For instance, in an embodiment, the metrics may include a queue delay measure, such as an instantaneous queue delay or an average queue delay, for a queue or group of queues. For a group of queues, the delay may be a maximum delay observed in the group. In an embodiment, the queue delay is a queue delay observed for egress queues in a traffic manager. The queue delay for a given path may be the queue delay measure(s) associated with the corresponding egress queue(s) in which the traffic manager enqueues data units belonging to the path before releasing them to the egress packet processor or another internal component associated with that path. Some examples of suitable mechanisms for calculating queue delay are described in, for example and without limitation, U.S. patent application Ser. No. 15/407,149, filed Jan. 16, 2017, which is hereby incorporated by reference for all purposes as if set forth in its entirety.

As another example, the metrics may include an instantaneous port loading measure, which is a ratio of an amount of data transmitted from a component, such as an amount of bytes, cells, data units, or other unit, to a maximum amount of data that could be transmitted from the component over a recent period of time (e.g., the last minute, last second, etc.). A port loading measure may be taken, for instance, at an egress packet processor, egress port, or other component. The port loading measure for a path may be the value of the port loading measure for any one or more internal components through which data units assigned to the path are to be sent. Of course, in yet other embodiments, other metrics may be collected, including without limitation metrics described elsewhere herein.

In an embodiment, a path state value may be computed for each path using the path state information collected for the path. Any suitable function or mapping mechanism based on one or more of the collected measures associated with the path may be used to compute the path state value. Block 442 may be performed on continual basis, such that path state information is continually updated, and is not necessarily limited to performance at the start of flow 400C.

Block 444 comprises receiving a data unit, such as a cell or packet, as described elsewhere herein. Block 446 comprises identifying an ALB group to which the data unit belongs. The ALB group may be determined based on, for instance, a mapping of the destination of the data unit to a multipath group, such as a mapping of a specific address or group of addresses to an ECMP, LAG, or other group identifier. The ALB group may further be determined based on a class or other data type attribute of the data unit, in some embodiments.

Block 448 comprises identifying an ALB flow to which the data unit belongs. The ALB flow may be determined, for instance, based on a hash function of data unit attributes, as described elsewhere herein, or in any other suitable manner.

Block 450 comprises determining whether the ALB flow is active. An ALB flow may be active, for instance, if another data unit belonging to the ALB flow has been received within a certain period of time prior to the reception of the data unit in block 444. For instance, block 450 may comprise comparing a current time, or value derived therefrom, to a time value stored for the ALB flow, representing either a time when a last data unit was received for the ALB flow, or a timeout period at which the ALB flow is deemed to no longer be active, or timed out. In the former case, a timeout value may be calculated by adding a timeout threshold to the time value stored from the ALB flow. The timeout threshold may be specific to the path, specific to the ALB flow, specific to the ALB group, or global. In an embodiment, instead of a fixed timeout threshold, the timeout threshold may be based on metrics observed for the path or a group of paths. Other example techniques for determining if an ALB flow is inactive are described elsewhere herein.

Block 452 comprises, if the ALB flow is still active, identifying the path previously assigned to the ALB flow. This may comprise, for instance, loading the previously assigned path from a table that maps ALB flows to assigned paths. Example mapping mechanisms are described elsewhere herein.

Block 454 comprises determining whether the path is still valid. This may comprise, for instance, consulting path status information, such as status information indicating whether a port associated with the path is up (e.g., connected or enabled) or down (e.g., disconnected or disabled). Such information may be stored in a table, or determined readily from other sources. If the previously assigned path for the ALB flow is not valid, flow 400C proceeds to block 458, discussed subsequently. Otherwise, in block 456, the previously assigned path is selected to send the data unit.

Block 456 proceeds to block 464, which comprises updating the activity timeout for the ALB flow of the data unit based on the time at which the data unit was received, either at the network device, or at the path selection logic, depending on the embodiment. This may comprise, for instance, setting a time value associated with the ALB flow to a current time, or value derived therefrom. In embodiments where the time value reflects the end of a timeout period, a timeout threshold, as explained with respect to block 450, is added to the current time.

Returning to block 450, if the ALB flow is inactive, then flow 400C proceeds to block 458. Block 458 comprises selecting an optimal path from the set of valid paths associated with the ALB group, based on the state information collected in block 442. For instance, the path associated with the ALB group whose path state statistics indicate that it is associated with the least amount of queue delay and/or least amount of port loading may be selected as the optimal path. In an embodiment, the path with a best path state value, calculated as a function of queue delay and/or port loading, is selected as the optimal path. In an embodiment, a path from a subset of paths with highest performing path state information may be selected as the optimal path at random or in a round-robin fashion. In an embodiment, a path may be selected as the optimal path using a probabilistic function whereby each path is weighted in accordance to its path state information.

In yet another embodiment, a path selection sequence may be generated based on the path state information, and used to select an optimal path, as described in other sections.

Block 460 comprises selecting the new path to send the data unit. Block 462 comprises storing the new path assignment in association with the ALB flow, such that the new path will be recognized as the previously selected path in subsequent iterations of flow 400C involving data units belonging to the same ALB flow.

In an embodiment, sending a data unit may comprise, for instance, adding the data unit to one or more queues associated with the selected path, processing the data unit with a packet processor associate with its new path, sending the data unit out an egress port associated with the new path, and so forth. In an embodiment, a data unit may be sent to multiple destinations, in which case flow 400C may be repeated for each destination.

Flow 400C is but one example process flow for selecting a path for a data unit. Other process flows may include fewer, additional, and/or different elements in varying arrangements. For example, in some embodiments, path validity may be checked before flow activity. Hence, blocks 452 and 454 may be performed before block 450, such that flow activity is never determined for flows previously assigned to paths that are now invalid. In another embodiment, the flow activity check of block 450 may be skipped altogether, so that only the validity of a path is determined before deciding to use the previously assigned path. In yet other embodiments, the path validity check of block 454 may be skipped, such that all currently assigned paths are assumed to be valid (e.g., if path validity is handled by some other mechanism).

As another example, a default selection logic may be used in parallel with the path selection logic implemented in flow 400C, and a switching component may be configured to select between the two path selection logics based on various factors, such as whether the determined ALB group is eligible for ALB operations.

In an embodiment, hardware-based logic, such as within an FPGA, ASIC, or other circuitry, in a computing device such as a switch, a router, a line card in a chassis, a network device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods. Note that, although separate embodiments are discussed herein, any combination of embodiments and/or partial embodiments discussed herein may be combined to form further embodiments.

4.0. Implementation Mechanism—Hardware Overview

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, FPGAs, or other circuitry with custom programming to accomplish the techniques.

Though certain foregoing techniques are described with respect to a hardware implementation, which provides a number of advantages in certain embodiments, it will also be recognized that, in other embodiments, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

FIG. 5 is a block diagram that illustrates a computer system 500 that may be utilized in implementing the above-described techniques, according to an embodiment. Computer system 500 may be, for example, a desktop computing device, laptop computing device, tablet, smartphone, server appliance, computing mainframe, multimedia device, handheld device, networking apparatus, or any other suitable device. In an embodiment, FIG. 5 is a different view of the devices and systems described in previous sections.

Computer system 500 may include one or more ASICs, FPGAs, or other specialized circuitry 503 for implementing program logic as described herein. For example, circuitry 503 may include fixed and/or configurable hardware logic blocks for implementing some or all of the described techniques, input/output (I/O) blocks, hardware registers or other embedded memory resources such as random-access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 500 may include one or more hardware processors 504 configured to execute software-based instructions. Computer system 500 may also include one or more busses 502 or other communication mechanism for communicating information. Busses 502 may include various internal and/or external components, including, without limitation, internal processor or memory busses, a Serial ATA bus, a PCI Express bus, a Universal Serial Bus, a HyperTransport bus, an InfiniBand bus, and/or any other suitable wired or wireless communication channel.

Computer system 500 also includes one or more memories 506, such as a RAM, hardware registers, or other dynamic or volatile storage device for storing data units to be processed by the one or more ASICs, FPGAs, or other specialized circuitry 503. Memory 506 may also or instead be used for storing information and instructions to be executed by processor 504. Memory 506 may be directly connected or embedded within circuitry 503 or a processor 504. Or, memory 506 may be coupled to and accessed via bus 502. Memory 506 also may be used for storing temporary variables, data units describing rules or policies, or other intermediate information during execution of program logic or instructions.

Computer system 500 further includes one or more read only memories (ROM) 508 or other static storage devices coupled to bus 502 for storing static information and instructions for processor 504. One or more storage devices 510, such as a solid-state drive (SSD), magnetic disk, optical disk, or other suitable non-volatile storage device, may optionally be provided and coupled to bus 502 for storing information and instructions.

A computer system 500 may also include, in an embodiment, one or more communication interfaces 515 coupled to bus 502. A communication interface 518 provides a data communication coupling, typically two-way, to a network link 520 that is connected to a local network 522. For example, a communication interface 518 may be an integrated services digital network (ISDN) card, cable modem, satellite modem, or a modem to provide a data communication connection to a corresponding type of telephone line. As another example, the one or more communication interfaces 518 may include a local area network (LAN) card to provide a data communication connection to a compatible LAN. As yet another example, the one or more communication interfaces 518 may include a wireless network interface controller, such as a 802.11-based controller, Bluetooth controller, Long Term Evolution (LTE) modem, and/or other types of wireless interfaces. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by a Service Provider 526. Service Provider 526, which may for example be an Internet Service Provider (ISP), in turn provides data communication services through a wide area network, such as the world-wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

In an embodiment, computer system 500 can send packets and receive data through the network(s), network link 520, and communication interface 518. In some embodiments, this data may be data units that the computer system 500 has been asked to process and, if necessary, redirect to other computer systems via a suitable network link 520. In other embodiments, this data may be instructions for implementing various processes related to the described techniques. For instance, in the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution. As another example, information received via a network link 520 may be interpreted and/or processed by a software component of the computer system 500, such as a web browser, application, or server, which in turn issues instructions based thereon to a processor 504, possibly via an operating system and/or other intermediate layers of software components.

Computer system 500 may optionally be coupled via bus 502 to one or more displays 512 for presenting information to a computer user. For instance, computer system 500 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 512 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 512.

One or more input devices 514 are optionally coupled to bus 502 for communicating information and command selections to processor 504. One example of an input device 514 is a keyboard, including alphanumeric and other keys. Another type of user input device 514 is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. Yet other examples of suitable input devices 514 include a touch-screen panel affixed to a display 512, cameras, microphones, accelerometers, motion detectors, and/or other sensors. In an embodiment, a network-based input device 514 may be utilized. In such an embodiment, user input and/or other information or commands may be relayed via routers and/or switches on a Local Area Network (LAN) or other suitable shared network, or via a peer-to-peer network, from the input device 514 to a network link 520 on the computer system 500.

As discussed, computer system 500 may implement techniques described herein using customized hard-wired logic, one or more ASICs or FPGAs 503, firmware and/or program logic, which in combination with the computer system causes or programs computer system 500 to be a special-purpose machine. According to one embodiment, however, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and use a modem to send the instructions over a network, such as a cable network or cellular network, as modulated signals. A modem local to computer system 500 can receive the data on the network and demodulate the signal to decode the transmitted instructions. Appropriate circuitry can then place the data on bus 502. Bus 502 carries the data to main memory 506, from which processor 504 retrieves and executes the instructions. The instructions received by main memory 506 may optionally be stored on storage device 510 either before or after execution by processor 504.

5.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended by the applicants to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus comprising:
   a plurality of ingress ports that receive data units from sending network devices over a network;
   forwarding logic that sends the data units to destination network devices in the network via a plurality of paths associated with a plurality of egress ports;
   one or more state monitors that collect individual egress port statistics of the plurality of egress ports; and
   autonomous load-balancing path selection logic that:
   while a flow of data units has not been dormant for more than a certain period of time, instructs the forwarding logic to forward the data units to a first path assigned to the flow;
   responsive to determining that the first path assigned to the flow is to be moved from the flow, selects a second path to assign to the flow based on path state values of the plurality of paths, and instructs the forwarding logic to forward at least a first data unit of the data units associated with the flow via the second path;

wherein the path state values of the plurality of paths are dynamically updated based at least in part on the individual egress port statistics of the plurality of egress ports.

2. The apparatus of claim 1, wherein determining that the flow of the data units is to be moved from the first path assigned to the flow includes determining that the first path has failed.

3. The apparatus of claim 1, wherein determining that the flow of the data units is to be moved from the first path assigned to the flow includes determining that the first path has been dormant for longer than the certain period of time.

4. The apparatus of claim 1, wherein the individual egress port statistics of the plurality of egress ports include individual instantaneous port loading statistics of the plurality of egress ports.

5. The apparatus of claim 1, wherein the individual egress port statistics of the plurality of egress ports include individual queue delays of the plurality of egress ports.

6. The apparatus of claim 1, wherein the individual egress port statistics of the plurality of egress ports include individual port delays of the plurality of egress ports.

7. The apparatus of claim 1, wherein the individual egress port statistics of the plurality of egress ports include individual path delays of the plurality of paths associated with the plurality of egress ports.

8. The apparatus of claim 1, wherein the certain period of time represents one of: a time period adaptably set based at least in part on a port state in connection with the first path, a time period adaptably set based at least in part on a path state of the first path, a zero-length time interval, a non-zero finite time interval, or an infinite time period.

9. The apparatus of claim 1, wherein the flow of data units relates to one or more of: individual flows differentiated with different quality of service (QoS) levels; individual flows operating with different queues of different QoS levels; individual flows for forwarding data units of different combinations of traffic classes, priorities, destinations, or other traffic attributes; individual flows sent over paths sharing a specific common egress port; lossless flows; lossy flows; or individual flows sent over paths subject to adaptive load balancing based at least in part on different combinations of traffic attributes.

10. A method comprising:
receiving data units from sending network devices over a network;
sending the data units to destination network devices in the network via a plurality of paths associated with a plurality of egress ports;
collecting individual egress port statistics of the plurality of egress ports;
while a flow of data units has not been dormant for more than a certain period of time, instructs the forwarding logic to forward the data units to a first path assigned to the flow; and
responsive to determining that the first path assigned to the flow is to be moved from the flow, selects a second path to assign to the flow based on path state values of the plurality of paths, and instructs the forwarding logic to forward at least a first data unit of the data units associated with the flow via the second path;
wherein the path state values of the plurality of paths are dynamically updated based at least in part on the individual egress port statistics of the plurality of egress ports.

11. The method of claim 10, wherein determining that the flow of the data units is to be moved from the first path assigned to the flow includes determining that the first path has failed.

12. The method of claim 10, wherein determining that the flow of the data units is to be moved from the first path assigned to the flow includes determining that the first path has been dormant for longer than the certain period of time.

13. The method of claim 10, wherein the individual egress port statistics of the plurality of egress ports include individual instantaneous port loading statistics of the plurality of egress ports.

14. The method of claim 10, wherein the individual egress port statistics of the plurality of egress ports include individual queue delays of the plurality of egress ports.

15. The method of claim 10, wherein the individual egress port statistics of the plurality of egress ports include individual port delays of the plurality of egress ports.

16. The method of claim 10, wherein the individual egress port statistics of the plurality of egress ports include individual path delays of the plurality of paths associated with the plurality of egress ports.

17. The method of claim 10, wherein the certain period of time represents one of: a time period adaptably set based at least in part on a port state in connection with the first path, a time period adaptably set based at least in part on a path state of the first path, a zero-length time interval, a non-zero finite time interval, or an infinite time period.

18. The method of claim 10, wherein the flow of data units relates to one or more of: individual flows differentiated with different quality of service (QoS) levels; individual flows operating with different queues of different QoS levels; individual flows for forwarding data units of different combinations of traffic classes, priorities, destinations, or other traffic attributes; individual flows sent over paths sharing a specific common egress port; lossless flows; lossy flows; or individual flows sent over paths subject to adaptive load balancing based at least in part on different combinations of traffic attributes.

19. The method of claim 10, wherein the certain period of time represents one of: a time period adaptably set based at least in part on a port state in connection with the first path, a time period adaptably set based at least in part on a path state of the first path, a zero-length time interval, a non-zero finite time interval, or an infinite time period.

20. One or more non-transitory computer readable storage media, storing instructions that, when executed by one or more computing devices cause the one or more computing devices to perform:
receiving data units from sending network devices over a network;
sending the data units to destination network devices in the network via a plurality of paths associated with a plurality of egress ports;
collecting individual egress port statistics of the plurality of egress ports;
while a flow of data units has not been dormant for more than a certain period of time, instructs the forwarding logic to forward the data units to a first path assigned to the flow; and
responsive to determining that the first path assigned to the flow is to be moved from the flow, selects a second path to assign to the flow based on path state values of the plurality of paths, and instructs the forwarding logic to forward at least a first data unit of the data units associated with the flow via the second path;

wherein the path state values of the plurality of paths are dynamically updated based at least in part on the individual egress port statistics of the plurality of egress ports.

\* \* \* \* \*